(12) United States Patent
Hoff

(10) Patent No.: US 11,649,978 B2
(45) Date of Patent: May 16, 2023

(54) SYSTEM FOR PLOT-BASED FORECASTING FUEL CONSUMPTION FOR INDOOR THERMAL CONDITIONING WITH THE AID OF A DIGITAL COMPUTER

(71) Applicant: CLEAN POWER RESEARCH, L.L.C., Napa, CA (US)

(72) Inventor: Thomas E. Hoff, Napa, CA (US)

(73) Assignee: CLEAN POWER RESEARCH, L.L.C., Napa, CA (US)

( * ) Notice: Subject to any disclaimer, the term of this patent is extended or adjusted under 35 U.S.C. 154(b) by 34 days.

(21) Appl. No.: 17/366,968

(22) Filed: Jul. 2, 2021

(65) Prior Publication Data

US 2021/0332998 A1  Oct. 28, 2021

Related U.S. Application Data

(63) Continuation of application No. 17/086,791, filed on Nov. 2, 2020, now Pat. No. 11,054,163, which is a
(Continued)

(51) Int. Cl.
*F24F 11/30* (2018.01)
*G05B 13/02* (2006.01)
(Continued)

(52) U.S. Cl.
CPC ............ *F24F 11/30* (2018.01); *G05B 13/026* (2013.01); *F24F 2110/00* (2018.01);
(Continued)

(58) Field of Classification Search
CPC .... F24F 11/30; F24F 2110/00; F24F 2140/60; F24F 2130/00; F24F 2130/10; G05B 13/026; G05B 2219/2614
(Continued)

(56) References Cited

U.S. PATENT DOCUMENTS 3,923,038 A   12/1975   Cutchaw
4,089,143 A    5/1978   La Pietra
(Continued)

FOREIGN PATENT DOCUMENTS

CN    102155358    8/2011
JP      4799838    10/2011
(Continued)

OTHER PUBLICATIONS

Thomas Huld, "Estimating Solar Radiation and Photovoltaic System Performance," The PVGIS Approach, 2011 (printed Dec. 13, 2017).
(Continued)

*Primary Examiner* — Vu A Vu
(74) *Attorney, Agent, or Firm* — Patrick J. S. Inouye; Leonid Kisselev

(57) ABSTRACT

A Thermal Performance Forecast approach is described that can be used to forecast heating and cooling fuel consumption based on changes to user preferences and building-specific parameters that include indoor temperature, building insulation, HVAC system efficiency, and internal gains. A simplified version of the Thermal Performance Forecast approach, called the Approximated Thermal Performance Forecast, provides a single equation that accepts two fundamental input parameters and four ratios that express the relationship between the existing and post-change variables for the building properties to estimate future fuel consumption. The Approximated Thermal Performance Forecast approach marginally sacrifices accuracy for a simplified forecast. In addition, the thermal conductivity, effective window area, and thermal mass of a building can be determined using different combinations of utility consumption, outdoor temperature data, indoor temperature data, internal heating gains data, and HVAC system efficiency as inputs.

19 Claims, 15 Drawing Sheets

Related U.S. Application Data continuation of application No. 16/517,493, filed on Jul. 19, 2019, now Pat. No. 10,823,442, which is a continuation of application No. 15/343,079, filed on Nov. 3, 2016, now Pat. No. 10,359,206.

(51) Int. Cl.
| | | |
|---|---|---|
| F24F 130/10 | (2018.01) | |
| F24F 110/00 | (2018.01) | |
| F24F 140/60 | (2018.01) | |
| F24F 130/00 | (2018.01) | |

(52) U.S. Cl.
CPC ....... *F24F 2130/00* (2018.01); *F24F 2130/10* (2018.01); *F24F 2140/60* (2018.01); *G05B 2219/2614* (2013.01)

(58) Field of Classification Search
USPC ..................................................... 700/276
See application file for complete search history.

(56) References Cited

U.S. PATENT DOCUMENTS

| | | | |
|---|---|---|---|
| 4,992,942 A | 2/1991 | Bauerle et al. | |
| 5,001,650 A | 3/1991 | Francis et al. | |
| 5,177,972 A | 1/1993 | Sillato et al. | |
| 5,602,760 A | 2/1997 | Chacon et al. | |
| 5,803,804 A | 9/1998 | Meier et al. | |
| 6,134,511 A | 10/2000 | Subbarao | |
| 6,148,623 A | 11/2000 | Park et al. | |
| 6,366,889 B1 | 4/2002 | Zaloom | |
| 6,748,327 B1 | 6/2004 | Watson | |
| 7,451,017 B2 * | 11/2008 | McNally | G06Q 50/06 700/278 |
| 7,742,897 B2 | 6/2010 | Herzig | |
| 7,920,997 B2 * | 4/2011 | Domijan, Jr | G06Q 10/04 703/2 |
| 8,155,900 B1 | 4/2012 | Adams | |
| 8,369,994 B1 | 2/2013 | Rosen | |
| 9,007,460 B2 | 1/2015 | Schmidt et al. | |
| 9,020,650 B2 | 4/2015 | Lutze | |
| 9,086,585 B2 | 7/2015 | Hamada et al. | |
| 9,098,876 B2 | 8/2015 | Steven et al. | |
| 9,103,719 B1 | 8/2015 | Ho et al. | |
| 9,171,276 B2 | 10/2015 | Steven et al. | |
| 9,286,464 B2 | 3/2016 | Choi | |
| 9,524,529 B2 | 12/2016 | Sons et al. | |
| 11,054,163 B2 * | 7/2021 | Hoff | G05B 13/026 |
| 2002/0055358 A1 | 5/2002 | Hebert | |
| 2005/0055137 A1 | 3/2005 | Andren et al. | |
| 2005/0095978 A1 | 5/2005 | Blunn et al. | |
| 2005/0222715 A1 | 10/2005 | Ruhnke et al. | |
| 2007/0084502 A1 | 4/2007 | Kelly et al. | |
| 2007/0119718 A1 | 5/2007 | Gibson et al. | |
| 2007/0233534 A1 | 10/2007 | Martin et al. | |
| 2008/0258051 A1 | 10/2008 | Heredia et al. | |
| 2009/0037241 A1 | 2/2009 | Olsen et al. | |
| 2009/0125275 A1 | 5/2009 | Woro | |
| 2009/0154384 A1 | 6/2009 | Todd et al. | |
| 2009/0217965 A1 | 9/2009 | Dougal et al. | |
| 2009/0271154 A1 | 10/2009 | Coad et al. | |
| 2009/0302681 A1 | 12/2009 | Yamada et al. | |
| 2010/0161502 A1 | 6/2010 | Kumazawa et al. | |
| 2010/0188413 A1 | 7/2010 | Hao et al. | |
| 2010/0198420 A1 | 8/2010 | Rettger et al. | |
| 2010/0211222 A1 | 8/2010 | Ghosh | |
| 2010/0219983 A1 | 9/2010 | Peleg et al. | |
| 2010/0263709 A1 | 10/2010 | Norman et al. | |
| 2010/0309330 A1 | 12/2010 | Beck | |
| 2010/0324962 A1 | 12/2010 | Nesler et al. | |
| 2010/0332373 A1 | 12/2010 | Crabtree et al. | |
| 2011/0137591 A1 | 6/2011 | Ishibashi | |
| 2011/0137763 A1 | 6/2011 | Aguilar | |
| 2011/0145037 A1 | 6/2011 | Domashchenko et al. | |
| 2011/0272117 A1 | 11/2011 | Hamstra et al. | |
| 2011/0276269 A1 | 11/2011 | Hummel | |
| 2011/0282504 A1 | 11/2011 | Besore et al. | |
| 2011/0307109 A1 | 12/2011 | Sri-Jayantha | |
| 2012/0066168 A1 | 3/2012 | Fadell et al. | |
| 2012/0078685 A1 | 3/2012 | Krebs et al. | |
| 2012/0095798 A1 | 4/2012 | Mabari | |
| 2012/0130556 A1 | 5/2012 | Marhoefer | |
| 2012/0143383 A1 | 6/2012 | Cooperrider et al. | |
| 2012/0158350 A1 | 6/2012 | Steinberg et al. | |
| 2012/0191439 A1 | 7/2012 | Meagher et al. | |
| 2012/0271576 A1 | 10/2012 | Kamel et al. | |
| 2012/0278051 A1 | 11/2012 | Jiang et al. | |
| 2012/0310416 A1 | 12/2012 | Tepper et al. | |
| 2012/0310427 A1 | 12/2012 | Williams et al. | |
| 2012/0310729 A1 | 12/2012 | Daito et al. | |
| 2012/0330626 A1 | 12/2012 | An et al. | |
| 2013/0008224 A1 | 1/2013 | Stormbom | |
| 2013/0030590 A1 | 1/2013 | Prosser | |
| 2013/0054662 A1 | 2/2013 | Coimbra | |
| 2013/0060471 A1 * | 3/2013 | Aschheim | G01K 17/00 702/3 |
| 2013/0152998 A1 | 6/2013 | Herzig | |
| 2013/0166266 A1 | 6/2013 | Herzig et al. | |
| 2013/0204439 A1 | 8/2013 | Scelzi | |
| 2013/0245847 A1 | 9/2013 | Steven et al. | |
| 2013/0262049 A1 | 10/2013 | Zhang et al. | |
| 2013/0268129 A1 | 10/2013 | Fadell et al. | |
| 2013/0274937 A1 | 10/2013 | Ahn et al. | |
| 2013/0289774 A1 | 10/2013 | Day et al. | |
| 2013/0314699 A1 | 11/2013 | Jungerman et al. | |
| 2014/0039648 A1 | 2/2014 | Boult et al. | |
| 2014/0039709 A1 | 2/2014 | Steven et al. | |
| 2014/0039965 A1 | 2/2014 | Steven et al. | |
| 2014/0107851 A1 | 4/2014 | Yoon et al. | |
| 2014/0129197 A1 | 5/2014 | Sons et al. | |
| 2014/0142862 A1 | 5/2014 | Umeno et al. | |
| 2014/0214222 A1 | 7/2014 | Rouse et al. | |
| 2014/0222241 A1 | 8/2014 | Ols | |
| 2014/0236708 A1 | 8/2014 | Wolff et al. | |
| 2014/0278108 A1 | 9/2014 | Kerrigan et al. | |
| 2014/0278203 A1 | 9/2014 | Lange et al. | |
| 2014/0289000 A1 | 9/2014 | Hutchings et al. | |
| 2015/0019034 A1 | 1/2015 | Gonatas | |
| 2015/0057820 A1 | 2/2015 | Kefayati et al. | |
| 2015/0088576 A1 | 3/2015 | Steven et al. | |
| 2015/0094968 A1 | 4/2015 | Jia et al. | |
| 2015/0112497 A1 | 4/2015 | Steven et al. | |
| 2015/0134251 A1 | 5/2015 | Bixel | |
| 2015/0177415 A1 | 6/2015 | Bing | |
| 2015/0188415 A1 | 7/2015 | Abido et al. | |
| 2015/0269664 A1 * | 9/2015 | Davidson | G06Q 40/00 705/35 |
| 2015/0278968 A1 | 10/2015 | Steven et al. | |
| 2015/0323423 A1 * | 11/2015 | Alsaleem | F24F 11/30 62/127 |
| 2015/0326015 A1 | 11/2015 | Steven et al. | |
| 2015/0330923 A1 | 11/2015 | Smullin | |
| 2015/0332294 A1 | 11/2015 | Albert et al. | |
| 2015/0339762 A1 | 11/2015 | Deal et al. | |
| 2016/0049606 A1 | 2/2016 | Bartoli et al. | |
| 2016/0072287 A1 | 3/2016 | Jia et al. | |
| 2016/0140283 A1 | 5/2016 | Morse et al. | |
| 2016/0187911 A1 | 6/2016 | Carty et al. | |
| 2016/0226253 A1 | 8/2016 | Abido et al. | |
| 2016/0266594 A1 | 9/2016 | Kauffman et al. | |
| 2016/0305678 A1 | 10/2016 | Pavlovski et al. | |
| 2016/0306906 A1 | 10/2016 | McBrearty et al. | |
| 2016/0348936 A1 * | 12/2016 | Johnson, Jr | F24F 11/30 |
| 2017/0104451 A1 | 4/2017 | Gostein | |
| 2018/0010818 A1 | 1/2018 | Maruyama et al. | |
| 2018/0087795 A1 | 3/2018 | Okita et al. | |

FOREIGN PATENT DOCUMENTS

| | | |
|---|---|---|
| WO | 2007124059 | 1/2007 |
| WO | 2007142693 | 12/2007 |

(56) References Cited

FOREIGN PATENT DOCUMENTS

| WO | 2013181408 | 12/2013 |
|---|---|---|
| WO | 2014081967 | 5/2014 |
| WO | 2016164718 | 10/2016 |

OTHER PUBLICATIONS

Anderson et al., "Modelling The Heat Dynamics of a Building Using Stochastic Differential Equations," Energy and Building, vol. 31, 2000, pp. 13-24.
Brinkman et al., "Toward a Solar-Powered Grid." IEEE Power & Energy, vol. 9, No. 3, May/Jun. 2011.
California ISO. Summary of Preliminary Results of 33% Renewable Integration Study—2010 CPUC LTPP. Docket No. R. 10-05-006, May 10, 2011.
Ellis et al., "Model Makers." IEEE Power & Energy, vol. 9, No. 3, May/Jun. 2011.
Danny H.W. Li et al., "Analysis of solar heat gain factors using sky clearness index and energy implications." Energy Conversions and Management, Aug. 2000.
Hoff et al., "Quantifying PV Power Output Variability." Solar Energy 84 (2010) 1782-1793, Oct. 2010.
Hoff et al., "PV Power Output Variability: Calculation of Correlation Coefficients Using Satellite Insolation Data." American Solar Energy Society Annual Conference Proceedings, Raleigh, NC, May 18, 2011.
Kuszamaul et al., "Lanai High-Density Irradiance Sensor Network for Characterizing Solar Resource Variability of MW-Scale PV System." 35th Photovoltaic Specialists Conference, Honolulu, HI. Jun. 20-25, 2010.
Serban C. "Estimating Clear Sky Solar Global Radiation Using Clearness Index, for Brasov Urban Area". Proceedings of the 3rd International Conference on Maritime and Naval Science and Engineering. ISSN: 1792-4707, ISBN: 978-960-474-222-6.
Mills et al., "Dark Shadows." IEEE Power & Energy, vol. 9, No. 3, May/Jun. 2011.
Mills et al., "Implications of Wide-Area Geographic Diversity for Sort-Term Variability of Solar Power." Lawrence Berkeley National Laboratory Technical Report LBNL-3884E. Sep. 2010.
Perez et al., "Parameterization of site-specific short-term irradiance variability." Solar Energy, 85 (2011) 1343-1345, Nov. 2010.
Perez et al., "Short-term irradiance variability correlation as a function of distance." Solar Energy, Mar. 2011.
Philip, J., "The Probability Distribution of the Distance Between Two Random Points in a Box." www.math.kth.se/~johanph/habc.pdf. Dec. 2007.
Stein, J., "Simulation of 1-Minute Power Output from Utility-Scale Photovoltaic Generation Systems." American Solar Energy Society Annual Conference Proceedings, Raleigh, NC, May 18, 2011.
Solar Anywhere, 2011. Web-Based Service that Provides Hourly, Satellite-Derived Solar Irradiance Data Forecasted 7 days Ahead and Archival Data back to Jan. 1, 1998. www SolarAnywhere.com.
Stokes et al., "The atmospheric radiance measurement (ARM) program: programmatic background and design of the cloud and radiation test bed." Bulletin of American Meteorological Society vol. 75, No. 7, pp. 1201-1221, Jul. 1994.
Hoff et al., "Modeling PV Fleet Output Variability," Solar Energy, May 2010.
Olopade et al., "Solar Radiation Characteristics and the performance of Photovoltaic (PV) Modules in a Tropical Station." Journal Sci. Res. Dev. vol. 11, 100-109, 2008/2009.
Li et al., "Analysis of solar heat gain factors using sky clearness index and energy implications." 2000.
Shahab Poshtkouhi et al., "A General Approach for Quantifying the Benefit of Distributed Power Electronics for Fine Grained MPPT in Photovoltaic Applications Using 3-D Modeling," Nov. 20, 2012, IEE Transactions on Poweer Electronics, vol. 27, No. 11, p. 4656-4666.

Pathomthat Chiradeja et al., "An Approaching to Quantify the Technical Benefits of Distributed Generation," Dec. 2004, IEEE Transactions on Energy Conversation, vol. 19, No. 4, p. 764-773.
Mudathir Funsho Akorede et al., "Distributed Energy Resources and Benefits to the Environment," 2010, Renewable and Sustainable Energy Reviews 14, p. 724-734.
V.H. Mendez, et al., "Impact of Distributed Generation on Distribution Investment Deferral," 2006, Electrical Power and Energy Systems 28, p. 244-252.
Francisco M. Gonzalez-Longatt et al., "Impact of Distributed Generation Over Power Losses on Distribution System," Oct. 2007, Electrical Power Quality and Utilization, 9th International Conference.
M. Begovic et al., "Impact of Renewable Distributed Generation on Power Systems," 2001, Proceedings of the 34th Hawaii International Conference on System Sciences, p. 1-10.
M. Thomson et al., "Impact of Widespread Photovoltaics Generation on Distribution Systems," Mar. 2007, IET Renew. Power Gener., vol. 1, No. 1 p. 33-40.
Varun et al., "LCA of Renewable Energy for Electricity Generation Systems—A Review," 2009, Renewable and Sustainable Energy Reviews 13, p. 1067-1073.
Andreas Schroeder, "Modeling Storage and Demand Management in Power Distribution Grids," 2011, Applied Energy 88, p. 4700-4712.
Daniel S. Shugar, "Photovoltaics in the Utility Distribution System: The Evaluation of System and Distributed Benefits," 1990, Pacific Gas and Electric Company Department of Research and Development, p. 836-843.
Nguyen et al., "Estimating Potential Photovoltaic Yield With r.sun and the Open Source Geographical Resources Analysis Support System," Mar. 17, 2010, pp. 831-843.
Pless et al., "Procedure for Measuring and Reporting the Performance of Photovoltaic Systems in Buildings," 62 pages, Oct. 2005.
Emery et al., "Solar Cell Efficiency Measurements," Solar Cells, 17 (1986) 253-274.
Santamouris, "Energy Performance of Residential Buildings," James & James/Earchscan, Sterling, VA 2005.
Al-Homoud, "Computer-Aided Building Energy Analysis Techniques," Building & Environment 36 (2001) pp. 421-433.
J. Kleissl & Y. Agarwal, "Cyber-Physical Energy Systems: Focus on Smart Buildings," Design Automation Conference, Anaheim, CA, 2010, pp. 749-754, doi: 10.1145/1837274.1837464. (2010).
Clito Afonso, "Tracer gas technichue for measurement of air infiltration and natural ventilation: case studies amd new devices for measurement of mechamocal air ventilation in ducts." 2013, International Journal of Low-Carbon Technologies 2015, Issue 10, pp. 188-204 (Year: 2013).
Isaac Turiel et al., "Occupant-generated CO2 as an indicator of ventilation rate," 1980, Lawrence Berkley Laboratory, 26 pages (Year: 1980).
Andrew K. Persily, "Tracer gas techniques for studying building air exchange," 1988, National Bureau of Standards, 44 pages (Year: 1988).
Detlef Laussmann et al., "Air change measurements using tracer gasses," 2011, In book: Chemistry, Emission Control, Radioactive Pollution and Indoor Air Quality, 42 pages (Year: 2011).
Fine_1980(Analysis of Heat Transfer in Building Thermal Insulation, Oak Ridge National Laboratory ORNL/TM-7481) (Year: 1980).
Chapter2_1985 (Rates of Change and the Chain Rule, Springer-Verlag) (Year: 1985).
E.S. Mustafina et al. "Problems of Small Heat Power Stations and Ways to Solve Them," Proceedings. The 8th Russian-Korean International Symposiium on Science and Technology, 2004. KORUS 2004. Tomsk, Russia, 2004. pp. 267-270. vol. 1, doi:10.1109/KORUS.2004. 1555341. (Year 2004).
Di Yuhui, Di Yulin, Wang Yonghui and Wen Li, "Application and Analusis of Water Source Heat Pump System in Residential Buildings," 2011 International Symposium on Water Resource and Environmental Protection, 2011, pp. 2425-2428, doi: 10.1109/ISWREP.2011.5893758. (Year: 2011).

(56) References Cited

OTHER PUBLICATIONS

1997 Ashrae Handbook, "Chapter 28 Nonresidential Cooling and Heating Load Calculation Procedures," 1997, Ashrae, 65 pagges (Year: 1997).

2001 Ashrae Handbook, "Chapter 29 Nonresidential Cooling and Heating Load Calculation Procedures," 2001, Ashrae, 41 pagges (Year: 2001).

Jeffrey D. Spitler, "Load Calculation applications Manual (I-P)", 2014, second edition, chapter "Fundammentals of the Radiant Time Series Method," Ashrae, 31 pages (Year: 2014).

* cited by examiner

50

60

110

120

(con'd)

Daily Fuel

— Measured    ---- Predicted

Daily Fuel

Avg. Daily Outdoor Temperature

SYSTEM FOR PLOT-BASED FORECASTING FUEL CONSUMPTION FOR INDOOR THERMAL CONDITIONING WITH THE AID OF A DIGITAL COMPUTER

CROSS-REFERENCE TO RELATED APPLICATION

This patent application is a continuation of U.S. Pat. No. 11,054,163, issued Jul. 6, 2021; which is a continuation of U.S. Pat. No. 10,823,442, issued Nov. 3, 2020; which is a continuation of U.S. Pat. No. 10,359,206, issued Jul. 23, 2019, the priority date of which is claimed and the disclosure of which is incorporated by reference.

FIELD

This application relates in general to energy conservation and, in particular, to a system for plot-based forecasting fuel consumption for indoor thermal conditioning with the aid of a digital computer.

BACKGROUND

Thermal conditioning provides heating, air exchange, and cooled (dehumidified) air within a building to maintain an interior temperature and air quality appropriate to the comfort and other needs or goals of the occupants. Thermal conditioning may be provided through a centralized forced air, ducted heating, ventilating, and air conditioning (HVAC) system, through discrete components, such as electric baseboard heaters for heat, ceiling or area fans for air circulation, and window air conditioners for cooling, heat pumps for heating and cooling, or through a combination of thermal conditioning devices. However, for clarity herein, all forms of thermal conditioning equipment, whether a single do-all installed system or individual contributors, will be termed HVAC systems, unless specifically noted otherwise.

The types of thermal conditioning that are required inside of a building, whether heating, ventilating, or cooling, are largely dictated by the climate of the region in which the building is located and the season of the year. In some regions, like Hawaii, air conditioning might be used year round, if at all, while in other regions, such as the Pacific Northwest, moderate summer temperatures may obviate the need for air conditioning and heating may be necessary only during the winter months. Nevertheless, with every type of thermal conditioning, the costs of seasonal energy or fuel consumption are directly tied to the building's thermal efficiency. For instance, a poorly insulated building with significant sealing problems will require more overall HVAC usage to maintain a desired inside temperature than would a comparably-sized but well-insulated and sealed structure. As well, HVAC system efficiency, heating and cooling season duration, differences between indoor and outdoor temperatures, and internal temperature gains attributable to heat created by internal sources can further influence seasonal fuel consumption in addition to a building's thermal efficiency.

Forecasting seasonal fuel consumption for indoor thermal conditioning, as well as changes to the fuel usage rate triggered by proposed investments in the building or thermal conditioning equipment, must take into account the foregoing parameters. While the latter parameters are typically obtainable by the average consumer, quantifying a building's thermal conductivity remains a non-trivial task. Often, gauging thermal conductivity requires a formal energy audit of building exterior surfaces and their materials' thermal insulating properties, or undertaking empirical testing of the building envelope's heat loss and gain.

Once the building's thermal conductivity ($UA^{Total}$) and the accompanying parameters are known, seasonal fuel consumption can be estimated. For instance, a time series modelling approach can be used to forecast fuel consumption for heating and cooling, such as described in commonly-assigned U.S. Pat. No. 10,339,232, issued Jul. 2, 2019, the disclosure of which is incorporated by reference. In one such approach, the concept of balance point thermal conductivity replaces balance point temperature and solar savings fraction, and the resulting estimate of fuel consumption reflects a separation of thermal conductivity into internal heating gains and auxiliary heating. In a second approach, three building-specific parameters are first empirically derived through short-duration testing, after which those three parameters are used to simulate a time series of indoor building temperatures and fuel consumption. While both approaches usefully predict seasonal fuel consumption, as time series-focused models, neither lends itself well to comparative and intuitive visualizations of seasonal fuel consumption and of the effects of proposed changes to thermal conditioning components or properties.

Alternatively, heating season fuel consumption can be determined using the Heating Degree Day (HDD) approach, which derives fuel consumption for heating needs from measurements of outside air temperature for a given structure at a specific location. An analogous Cooling Degree Day (CDD) approach exists for deriving seasonal fuel consumption for cooling. Although widely used, the HDD approach has three notable limitations. First, the HDD approach incorrectly assumes that heating season fuel consumption is linear with outside temperature. Second, the HDD approach often neglects the effect of thermal insulation on a building's balance point temperature, which is the indoor temperature at which heat gained from internal sources equals heat lost through the building's envelope. In practice, heavily insulated buildings have a lower balance point temperature than is typically assumed by the HDD approach. Third, required heating (or cooling) depends upon factors other than outdoor temperature alone, one factor of which is the amount of solar radiation reaching the interior of a building. In addition to these three procedural weaknesses, the HDD approach fails to separate input assumptions from weather data, nor is intuitive to the average consumer. (For clarity, the Heating Degree Day and Cooling Degree Day approaches will simply be called the Degree Day approach, unless indicated to the contrary.)

Therefore, a need remains for a practical and comprehendible model for predicting a building's seasonal fuel consumption that is readily visualizable.

A further need remains for a practical and comprehendible model for predicting changes to a building's seasonal fuel consumption in light of possible changes to the building's thermal envelope or thermal conditioning componentry.

SUMMARY

A Thermal Performance Forecast approach is described that can be used to forecast heating and cooling fuel consumption based on changes to user preferences and building-specific parameters that include desired indoor temperature (specified by adjusting the temperature setting of a thermostat), building insulation, HVAC system efficiency, and internal heating gains. A simplified version of the Thermal Performance Forecast approach, called the Approximated Thermal Performance Forecast, provides a single equation that accepts two fundamental input parameters and four ratios that express the relationship between the existing and post-change variables for the building properties to estimate future fuel consumption. The Approximated Thermal Performance Forecast approach marginally sacrifices accuracy for a simplified forecast. In addition, the thermal conductivity, effective window area, and thermal mass of a building can be determined using different combinations of utility consumption, outdoor temperature data, indoor temperature data, internal heating gains data, and HVAC system efficiency as inputs.

In one embodiment, a system and method for plot-based forecasting of building seasonal fuel consumption for indoor thermal conditioning with the aid of a digital computer a provided. Historical daily fuel consumption for thermal conditioning of a building during a time period is obtained. Internal gains within the building over the time period are obtained. Adjusted internal gains for the building using a plot, including: obtaining average daily outdoor temperatures over the time period; generating the plot of the historical daily fuel consumption averaged on a daily basis versus the average daily outdoor temperatures over the time period; determining the slope of the plot, convert the slope into average daily fuel usage rate, and equate the converted slope of the plot to the ratio of thermal conductivity over an efficiency of an HVAC system that provides the thermal conditioning to the building; equating the x-intercept of the plot to a balance point temperature for the building; and evaluating the adjusted internal gains as a function of the ratio of thermal conductivity over HVAC system efficiency, difference between average indoor temperature and the balance point temperature, and the duration of the time period. Seasonal fuel consumption for the building associated with a change to the building is forecast using the historical daily fuel consumption and the adjusted internal gains, wherein the steps are performed by a suitably-programmed computer.

Both the Thermal Performance Forecast approach and Approximated Thermal Performance Forecast approach provide superior alternatives to the Degree Day approach in estimating seasonal fuel consumption. The Thermal Performance Forecast approach addresses the shortcomings of the Degree Day approach, while retaining the latter's simplicity. In addition, the Thermal Performance Forecast approach provides a comprehensive thermal analysis in an easily understood format that can provide valuable insights to residential and commercial end users, utilities, and policy makers.

Moreover, both approaches are significant improvements upon conventional methodologies and offer valuable analytical tools. Both of these approaches offer side-by-side comparison of alternatives scenarios, a feature not provided by conventional techniques. The ability to make side-by-side comparisons enables customers to ensure that their investments result in the biggest impact per dollar spent.

Finally, fundamental building thermal property parameters, including thermal conductivity, effective window area, and thermal mass can be determined without the need for on-site visits or empirical testing, which significantly streamlines energy analysis. For instance, these parameters can be input into time series modelling approaches to forecast hourly fuel consumption.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 18 is a graph showing, by way of example, predicted versus measured daily fuel consumption for the efficient house over time.

FIG. 19 is a graph showing, by way of example, daily heating fuel consumption versus average outdoor temperature for the heating season for the inefficient house.

DETAILED DESCRIPTION

Seasonal and annual fuel consumption for the thermal conditioning of a building can be forecast using a Thermal Performance Forecast approach, which uses empirically-derived inputs and is intuitive enough for the average consumer to apply and understand. The approach offers a unified solution for both heating and cooling seasons with building-specific forecasts that provide clarity about how proposed energy investments may affect building performance and side-by-side comparisons for a wide variety of building upgrades, including proposed changes to thermal conditioning components or properties.

In a further embodiment, a simplified version, the Approximated Thermal Performance Forecast approach, is easier to perform while minimally reducing forecasting accuracy. Only two input parameters, the amount of seasonal fuel consumed for heating (or cooling) and adjusted internal gains, are required. One or more changes to thermal conductivity, desired indoor temperature, internal heating gains, and HVAC system efficiency can then be modeled to evaluate their effects on seasonal fuel consumption. This forecast is useful to consumers wishing to optimize building improvements, businesses hoping to improve occupant comfort while reducing costs, and policymakers seeking to better understand which building improvements are worthy of incentives.

Figure 1:
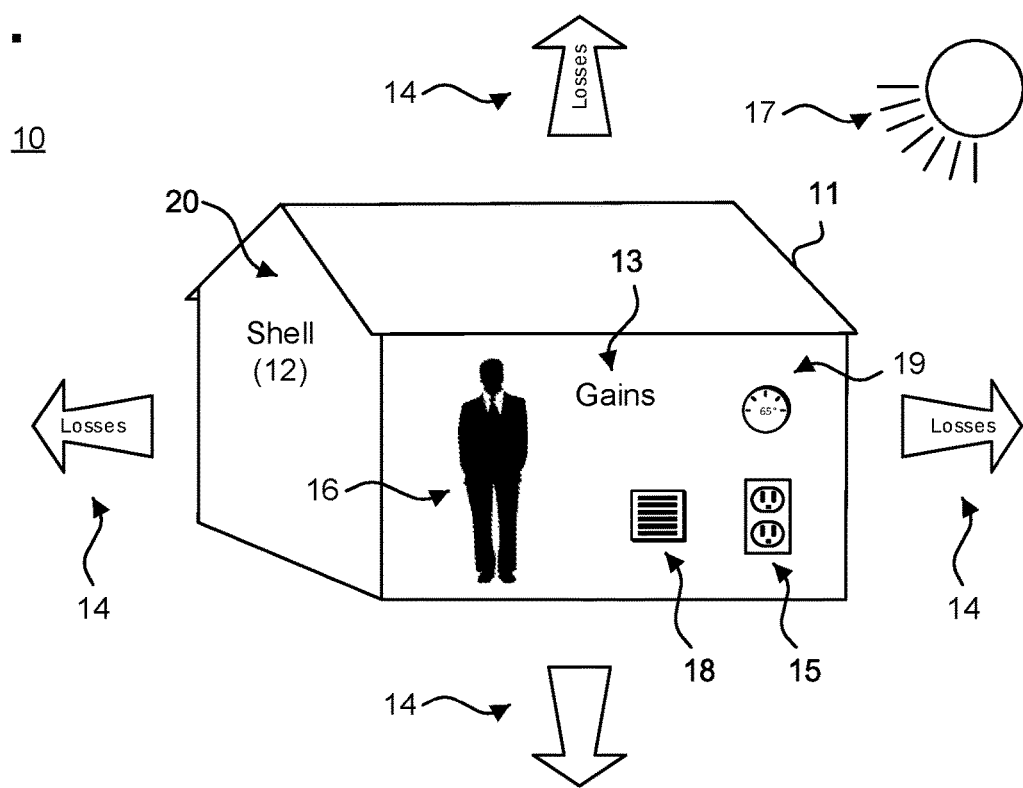
FIG. 1 is a functional block diagram showing heating losses and gains relative to a structure.

By way of introduction, the foundational building blocks underpinning the Thermal Performance Forecast approach will now be discussed. FIG. 1 is a functional block diagram 10 showing heating losses and gains relative to a structure 11. Inefficiencies in the shell 12 (or envelope) of a structure 11 can result in losses in interior heating 14, whereas internal gains $Q^{Internal}$ 13 in heating generally originate either from sources within (or internal to) the structure 11, including waste heat from operating electric appliances $Q^{Electric}$ 15 in the structure 11, the heat from occupants $Q^{Occupants}$ 16 of the structure 11, and the amount of solar radiation or solar gains $Q^{Solar}$ 17 reaching the interior of the structure 11, or from auxiliary heating sources 18 that are specifically intended to provide heat to the structure's interior.

Internal Gains

Internal gains $Q^{Internal}$ 13 represent the heat that a building gains internally that are attributable to sources within the building. The HDD approach only considers waste heat from operating electric appliances $Q^{Electric}$ and heat generated by a building's occupants $Q^{Occupants}$. By contrast, internal gains $Q^{Internal}$ for the Thermal Performance Forecast approach includes internal gains from electricity $Q^{Electric}$ 15 and internal gains from occupants $Q^{Occupants}$ 16, and also factors in internal solar gains $Q^{Solar}$ 17, such that:

$$Q^{Internal} = Q^{Electric} + Q^{Occupants} + Q^{Solar} \tag{1}$$

Solar Gains and Effective Window Area

Solar energy that enters through windows, doors, and other openings and surfaces in a building (opaque or non-opaque) will heat the interior. Solar gains $Q^{Solar}$ equal the amount of solar radiation reaching the interior of a building. The source of the solar data must be consistent as between calculating the effective window area and forecasting seasonal fuel consumption. For instance, if global horizontal irradiance (GHI) is used as the solar data for the effective window area calculation, the GHI should also be used in the forecasting model. Solar gains $Q^{Solar}$ can be estimated based upon the effective window area W (in m²) multiplied by the available solar resource Solar (in kWh/m²):

$$Q^{Solar} = (W)(\text{Solar}) \tag{2}$$

In turn, effective window area W can be calculated by substituting Equation (2) into Equation (1) and solving for W:

$$W = \frac{Q^{Internal} - (Q^{Electric} + Q^{Occupants})}{\text{Solar}} \tag{3}$$

Effective window area W can also be empirically derived through a series of sequentially-performed short duration tests, such as described in commonly-assigned U.S. Pat. No. 10,339,232, cited supra, which also sets forth the basis of Equation (2) for estimating the solar gains $Q^{Solar}$ using the effective window area W.

Equation (3) implies that effective window area W can be calculated based on overall internal gains $Q^{Internal}$, internal gains from electricity $Q^{Electric}$, internal gains from occupants $Q^{Occupants}$, and the available solar resource Solar.

Balance Point Temperature

The balance point temperature $T^{Balance-Point}$ is the indoor temperature at which heat gained from internal sources, including the solar gains $Q^{Solar}$ (but not in the Degree Day approach) equals heat lost through the building's envelope. The balance point temperature 19 can be derived from internal gains 13. When applied over a heating (or cooling) season, internal gains 13 equals the building's thermal conductivity $UA^{Total}$ multiplied by the difference between the average indoor temperature $T^{Indoor}$ and the balance point temperature 19 applicable to the heating (or cooling) season, multiplied by the number of hours H in the heating (or cooling) season:

$$Q^{Internal} = UA^{Total}\left(T^{Indoor} - T^{Balance-Point}\right)H \tag{4}$$

Internal gains $Q^{Internal}$ can be converted to average internal gains $\overline{Q}^{Internal}$ by dividing by the number of hours in the heating (or cooling) season. Solving for balance point temperature $T^{Balance\text{-}Point}$:

$$T^{Balance\text{-}Point} = \overline{T}^{Indoor} - \frac{\overline{Q}^{Internal}}{UA^{Total}} \quad (5)$$

A building's overall thermal conductivity ($UA^{Total}$) can be estimated through an energy audit that first measures or verifies the surface areas of all non-homogeneous exterior-facing surfaces and then determines the insulating properties of the materials used within. Those findings are combined with the difference between the indoor and outdoor temperature to arrive at the building's overall thermal conductivity. Alternatively, $UA^{Total}$ can be empirically determined through a short-duration controlled test, such as described in commonly-assigned U.S. Pat. No. 10,024,733, issued Jul. 17, 2018, the disclosure of which is incorporated by reference. The controlled test is performed with a switched heating source over a test period and overall thermal performance is estimated by balancing the heat gained within the building with the heat lost during the test period. Still other ways to determine $UA^{Total}$ are possible.

Adjusted Internal Gains

Internal gains $Q^{Internal}$ can be converted into adjusted internal gains $Q^{Adj.Internal}$ by adjusting for season and HVAC system efficiency. The season adjustment causes internal gains 13 to either be subtracted from fuel requirements during the heating season or added to fuel requirements during the cooling season. The season adjustment is made by multiplying internal gains $Q^{Internal}$ by a binary flag HeatOrCool that is set to 1 for the heating season and to −1 for the cooling season. The HVAC system efficiency adjustment reflects the equivalent amount of fuel required to deliver the same amount of heating (or cooling) based on the HVAC system efficiency $\eta^{HVAC}$. To convert internal gains $Q^{Internal}$ into adjusted internal gains $Q^{Adj.Internal}$:

$$Q^{Adj.Internal} = (HeatOrCool)\left(\frac{Q^{Internal}}{\eta^{HVAC}}\right) \quad (6)$$

Substituting in Equation (4):

$$Q^{Adj.Internal} = (HeatOrCool)\left(\frac{Q^{Internal}}{\eta^{HVAC}}\right)(\overline{T}^{Indoor} - T^{Balance\text{-}Point})H \quad (7)$$

Thermal Mass

A building's thermal mass M represents another source of heating (or cooling) when the building's indoor temperature is not in equilibrium due to heat being stored in (or drawn from) the building. The effects of thermal mass 20 are more impactful over shorter time periods, such as a day or less. A building's heat capacity (in kWh) that is associated with a change in indoor temperature equals the building's thermal mass M (in kWh/° F.) multiplied by the difference between the ending indoor temperature $T_{End\ Time}^{Indoor}$ and starting indoor temperature $T_{Start\ Time}^{Indoor}$:

$$Q^{Thermal\ Mass} = M(T_{Start\ Time}^{Indoor} - T_{End\ Time}^{Indoor}) \quad (8)$$

This result is described more fully in commonly-assigned U.S. Pat. No. 10,339,232, cited supra.

Comparison of Approaches

The Degree Day approach derives fuel consumption for heating and cooling needs from measurements of outside air temperature for a given structure at a specific location, while the Thermal Performance Forecast approach uses empirically-derived inputs to generate building-specific forecasts of seasonal fuel consumption in a weather data-independent fashion.

Degree Day Approach

Figure 2:
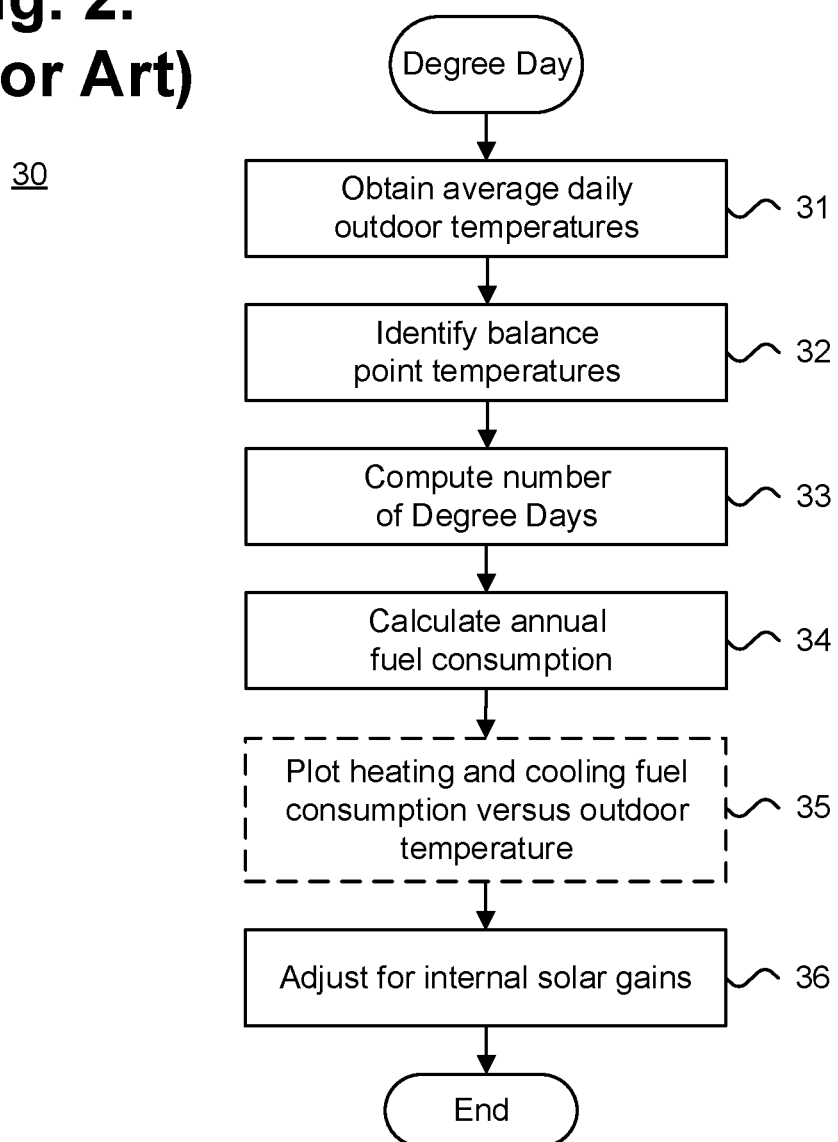
FIG. 2 is a flow diagram showing a prior art method for modeling periodic building energy consumption for thermal conditioning using the Degree Day approach.

First, consider the Degree Day approach. FIG. 2 is a flow diagram showing a prior art method 30 for modeling periodic building energy consumption for thermal conditioning using the Degree Day approach. Execution of the software can be performed with the assistance of a computer system.

First, average daily outdoor temperatures are obtained over a period of interest, such as a year, as input data (step 31). Balance point temperatures 19 for the structure are then identified (step 32). During the heating season, the balance point temperature 19 is the temperature at which the internal gains 13 provide a sufficient amount of heat such that auxiliary heating 18 is only required to meet the heating needs below this temperature. During the cooling season, the balance point temperature 19 is the temperature at which the air conditioning system must be operated to remove the internal gains 13. The number of degree days is computed over the entire period (step 33). The heating degree days equal the sum of average daily temperatures below the balance point temperature 19, that is, 63° F. in FIG. 4, and the cooling degree days equal the sum of average daily temperatures above the balance point temperature 19, that is, 67° F. in FIG. 4. Annual fuel consumption is then calculated (step 34) by combining number of heating and cooling degree days with the building's thermal conductivity $UA^{Total}$ and HVAC system efficiency $\eta^{HVAC}$. Optionally, for purposes of visualization and understanding, as further discussed infra with reference to FIG. 4, the heating and cooling fuel consumption can be plotted against the average daily outdoor temperatures (step 35). Finally, the annual fuel consumption is adjusted for internal solar gains 17 (step 36).

Thermal Performance Forecast Approach

Figure 3:
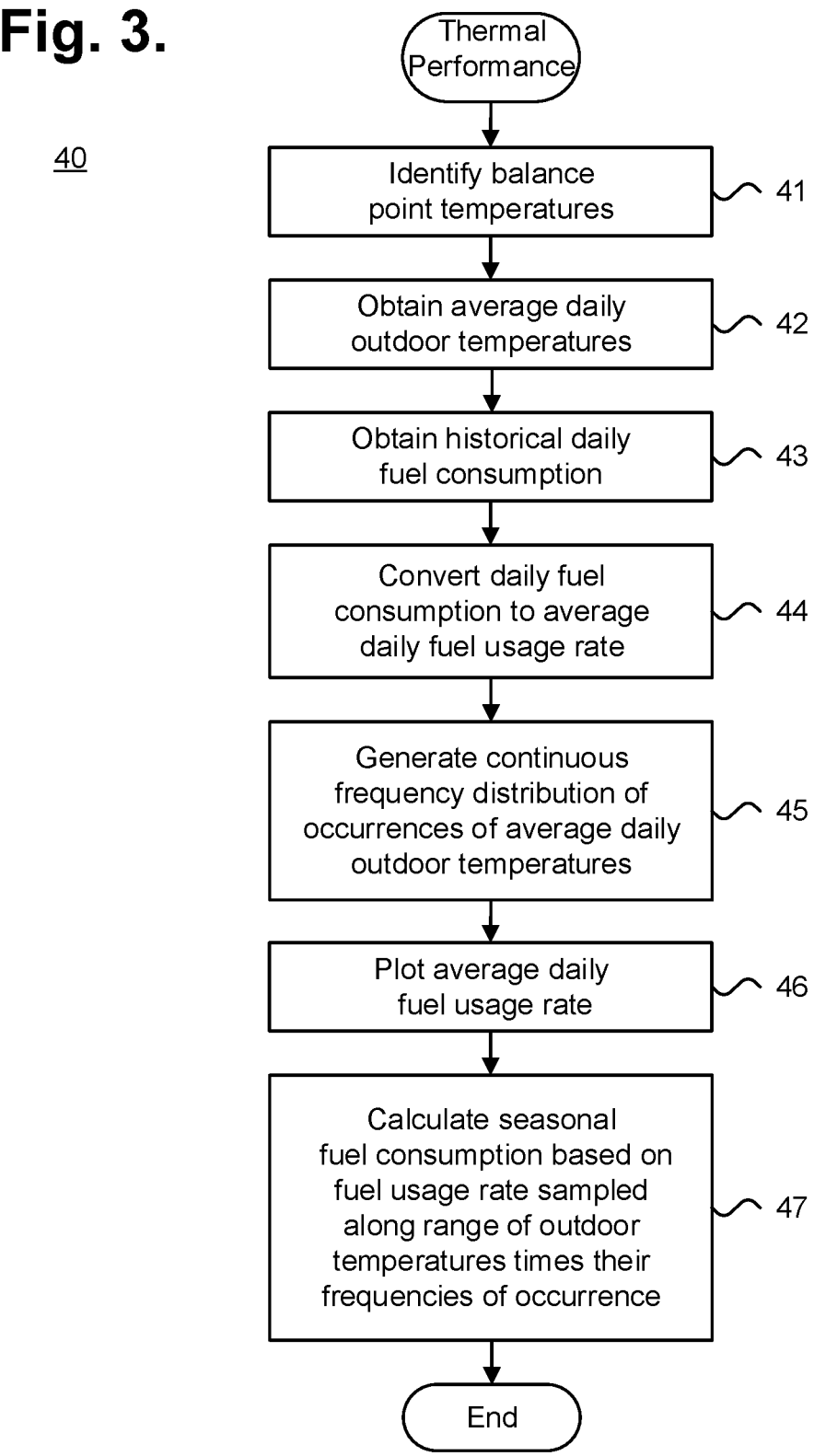
FIG. 3 is a flow diagram showing a method for forecasting seasonal fuel consumption for indoor thermal conditioning using the Thermal Performance Forecast approach with the aid of a digital computer in accordance with one embodiment.

Next, consider the Thermal Performance Forecast approach. FIG. 3 is a flow diagram showing a method 40 for forecasting seasonal fuel consumption for indoor thermal conditioning using the Thermal Performance Forecast approach with the aid of a digital computer in accordance with one embodiment. Execution of the software can be performed with the assistance of a computer system, such as further described infra with reference to FIG. 23, as a series of process or method modules or steps.

First, balance point temperatures 19 for the structure are identified (step 41). The balance point temperatures 19 can be identified in the same fashion as for the Degree Day approach, but with the inclusion of internal solar gains 17, as discussed supra with reference to Equation (1). Ordinarily, there will be a different balance point temperature 19 for the heating season versus the cooling season. If fuel consumption is being forecast over an entire year, both balance point temperatures 19 will be needed. Otherwise, only the balance point temperature 19 applicable to the season for which fuel consumption is being forecast will be required.

Next, the average daily outdoor temperatures are obtained over an earlier period of interest, such as a year or just for the applicable (heating or cooling) season, as input data (step 42). If the outside temperature data is in an hourly format, the outside temperature must be converted into average daily values. Historical daily fuel consumption is obtained for the applicable season (step 43), which reflects the fuel consumed to maintain the building's indoor temperature between the balance point temperature 19 and the average daily outdoor temperatures. The historical daily fuel consumption can be measured, for example, directly from a customer's utility bills. The historical daily fuel consumption is then converted into an average daily fuel usage rate (step 44) by dividing by 24, that is, energy in kWh/day divided by 24 hours/day results in units of kW. A continuous frequency distribution of the occurrences of average daily outdoor temperatures is generated (step 45). The average daily fuel usage rate is also plotted versus the average daily outdoor temperature (step 46), as further discussed infra with reference to FIG. 5. Finally, seasonal fuel consumption is calculated (step 47) as the fuel usage rate sampled along the range of average daily outdoor temperatures times the temperatures' respective frequencies of occurrence, as per Equation (14), discussed in detail infra.

Differences

While both methodologies can generate forecasts of seasonal fuel consumption, the Degree Day approach overly relies on outdoor temperature, which is assumed to be as linear to fuel consumption and is considered exclusive to other factors, including the effects of thermal insulation on a building's balance point temperature 19 and internal solar gains 17. This overreliance on outdoor temperature is reflected in the manner in which Degree Day forecasting results are visualized. To compare the Degree Day and Thermal Performance Forecast approaches, one year of historical outdoor temperature data was obtained from SolarAnywhere®, a Web-based service operated by Clean Power Research, L.L.C., Napa, Calif., for Washington, D.C. for the time period running from Jan. 1, 2015 to Dec. 31, 2015. Seasonal thermal conditioning needs and, where applicable, fuel consumption were determined by each approach and visualized.

Figure 4:
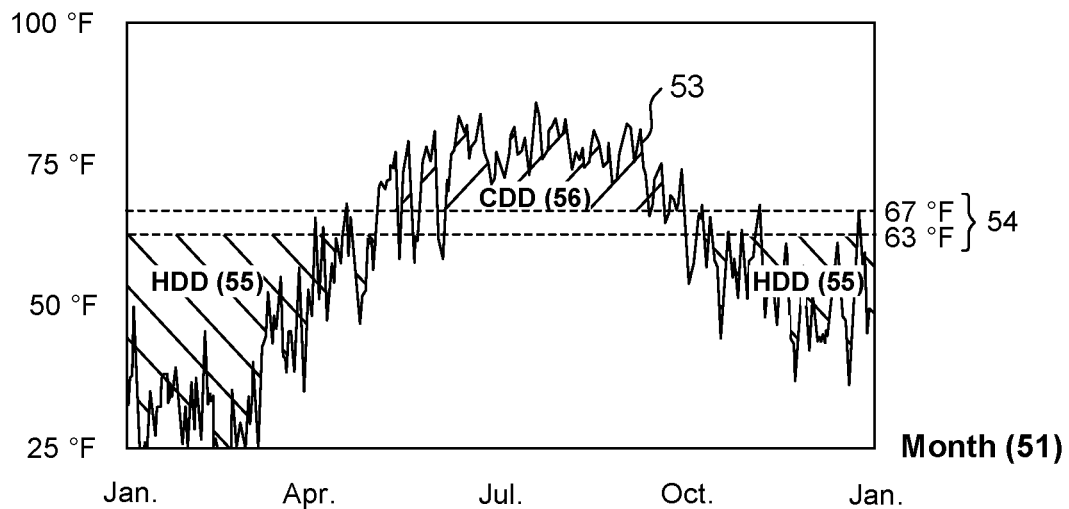
FIG. 4 is a graph showing, by way of example, seasonal thermal conditioning needs as determined through the Degree Day approach.

For the Degree Day approach, the hourly outside temperature data was first converted into average daily values. FIG. 4 is a graph 50 showing, by way of example, seasonal thermal conditioning needs as determined through the Degree Day approach. The x-axis 51 represents the month. They-axis 52 represents the temperature (in ° F.). The average daily temperatures 53 were plotted over the course of the year to reflect the average temperature that was recorded for each day. During the heating season, the balance point temperature 54 was 63° F. based on an indoor temperature of 68° F., which meant that the heater had to be operated when the average daily temperature was below 63° F. The total number of heating degree days (HDD) 55 equal the sum of the average daily temperatures below 63° F. across the year. Similarly, during the cooling season, the balance point temperature 54 was 67° F. based on an indoor temperature of 72°, which meant that the air conditioning had to be operated when the temperature is above 67° F. The total number of cooling degree days (CDD) 56 equal the sum of the average daily temperatures above 67° F. across the year.

When presented in this fashion, the Degree Day approach allows seasonal thermal conditioning needs to be visualized in terms of heating and cooling degree days. Here, the key weather-related inputs are the number of heating and cooling degree days; however, the approach intermingles weather data with user preferences, specifically, the desired indoor temperature, and building-specific parameters, including internal heating gains and building shell losses. Consequently, changes to any of these non-weather data values can affect the number of heating and cooling degree days, thus triggering a recalculation with the result that detailed average daily outdoor temperature data must be retained to accurately re-calculate the seasonal fuel consumption.

Figure 5:
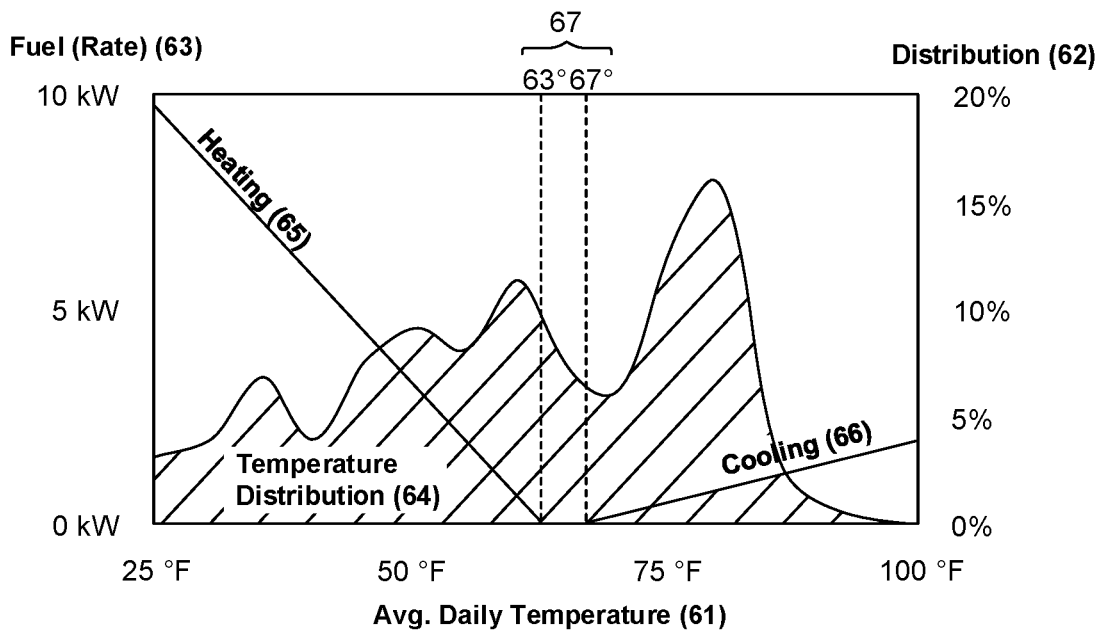
FIG. 5 is a graph showing, by way of example, seasonal thermal conditioning needs and annual fuel consumption as determined through the Thermal Performance Forecast approach.
Figure 6:
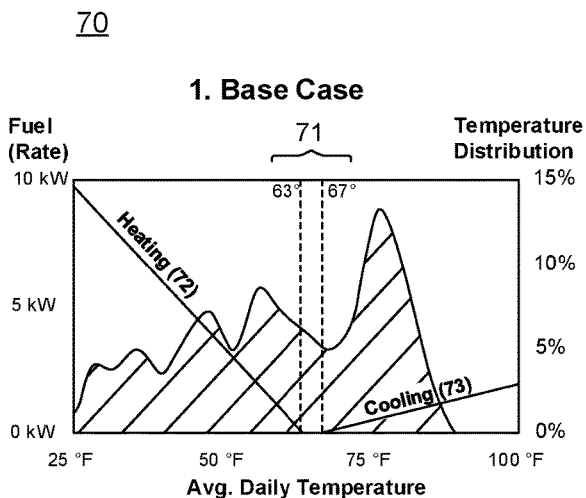
FIG. 6 is a graph showing, by way of example, the base thermal conditioning needs and annual fuel consumption for a building.
Figure 7:
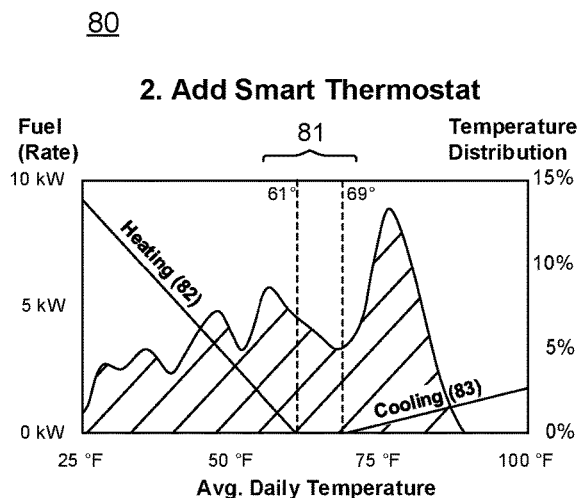
FIG. 7 is a graph showing, by way of example, the thermal conditioning needs and annual fuel consumption for the building of FIG. 6 following addition of a smart thermostat.
Figure 8:
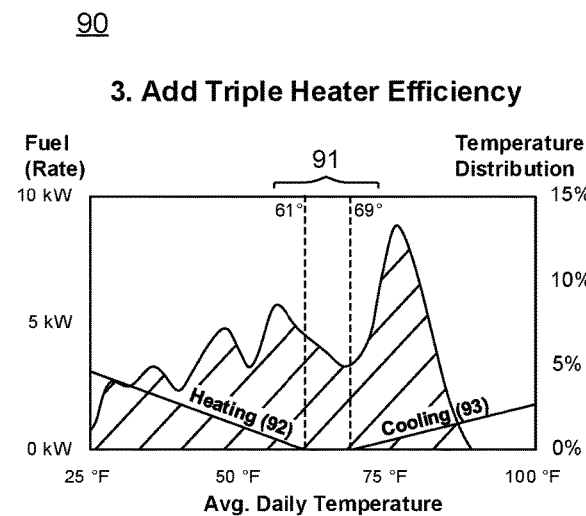
FIG. 8 is a graph showing, by way of example, the thermal conditioning needs and annual fuel consumption for the building of FIG. 7 following addition of a triple heater efficiency.
Figure 9:
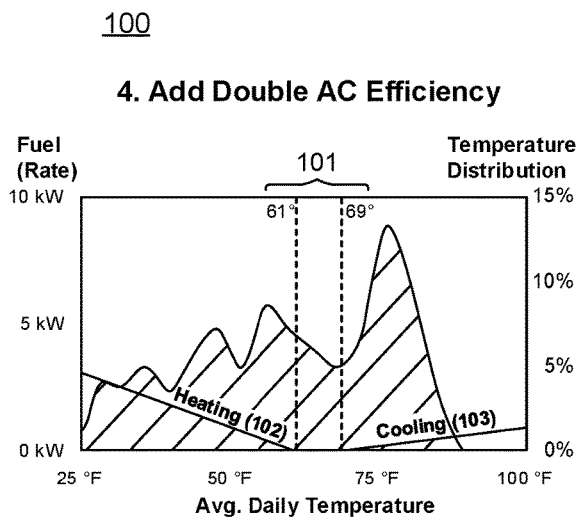
FIG. 9 is a graph showing, by way of example, the thermal conditioning needs and annual fuel consumption for the building of FIG. 8 following addition of double air conditioning efficiency.
Figure 10:
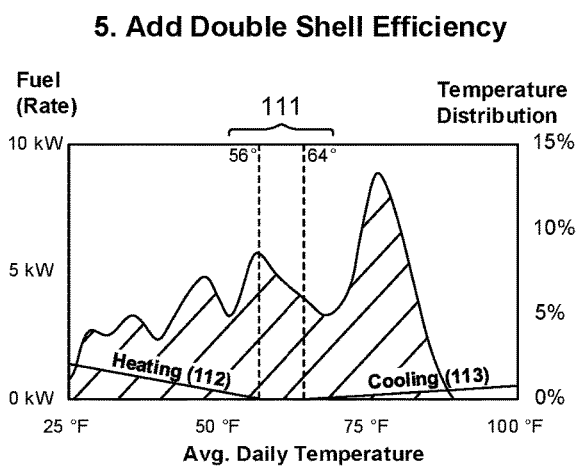
FIG. 10 is a graph showing, by way of example, the thermal conditioning needs and annual fuel consumption for the building of FIG. 9 following addition of double shell efficiency.
Figure 11:
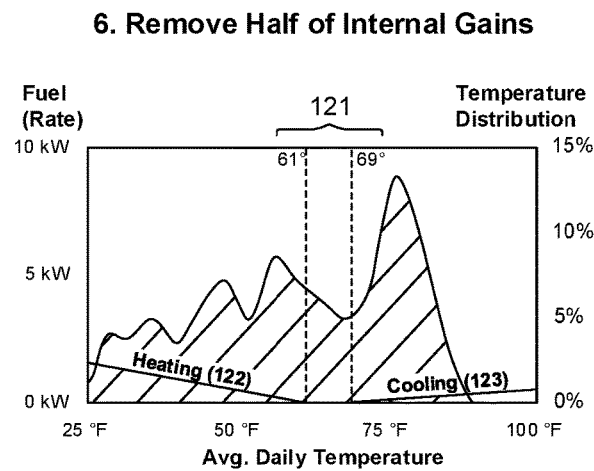
FIG. 11 is a graph showing, by way of example, the thermal conditioning needs and annual fuel consumption for the building of FIG. 10 following removal of half of the internal gains.

For the Thermal Performance Forecast approach, the hourly outside temperature data was converted into average daily values and a continuous frequency distribution was generated. FIG. 5 is a graph 60 showing, by way of example, seasonal thermal conditioning needs and annual fuel consumption as determined through the Thermal Performance Forecast approach. The x-axis 61 represents the temperature 61 (in ° F.). There are two y-axes 62, 63. The right-hand y-axis 62 represents the value of the average daily temperature's frequency distribution 64 (as a percentile), which corresponds to a plot of the frequency of occurrence distribution of the average daily temperatures 64 over the range of average daily temperatures. The left-hand y-axis 63 represents the average daily fuel usage rate (in kW), which corresponds to plots of fuel consumption respectively for heating 65 and cooling 66 over the range of the average daily temperatures. Instantaneous fuel consumption can be calculated by multiplying the fuel usage rate for a given average daily temperature by the frequency of occurrence for that temperature. For instance, an average daily temperature of 25° F. would require fuel usage rate of slightly less than 10 kW for roughly 4% of the one-year time period.

The Thermal Performance Forecast graph 60 is more intuitive to understand than the Degree Day graph 50. Here, the key weather-related input to the Thermal Performance Forecast is the continuous frequency distribution of the average daily temperatures. Importantly, the plots of fuel usage rate for heating 65 and cooling 66 are superimposed over the frequency distribution 64, which keeps the weather data separate from factors that can affect fuel usage rate, such as the structure's thermal conductivity, desired indoor temperature, internal heating gains, and HVAC system efficiency. Moreover, the separation of weather data from such factors enables proposed changes to be evaluated by a simple visual inspection of the graph 60. For instance, heating or cooling costs are high if the respective slopes of the fuel usage rates for heating 65 or cooling 66 are steep. Conversely, heating or cooling costs are low if the slopes are gentle. This aspect of the Thermal Performance Forecast graph 60 allows consumers to make simple side-by-side comparisons of proposed investments in the building or thermal conditioning equipment. If a consumer were trying to evaluate the cost savings by installing a Smart Thermostat, for example, the Degree Day approach requires a recalculation due to the intermingling of weather data with user preferences and building-specific parameters, whereas the Thermal Performance Forecast approach does not require a recalculation and cost savings can be readily visualized by the changes to the slopes of the plots of fuel usage rates.

Annual Fuel Consumption (Heating Season)

Consider the amount of fuel consumed during the heating season. Assume that the internal gains 13 are constant throughout the heating season and that HVAC system efficiency $\eta^{HVAC}$ is only dependent upon the difference between indoor and outdoor temperature and not on absolute outdoor temperature. Note that this assumption would be accurate for a fuel-burning technology; however, a modification to that assumption may be required for heat pump technologies since their efficiency is dependent upon outdoor temperature.

With the Thermal Performance Forecast approach, annual heating fuel consumption, per Equation (9), equals the sum of the product of the heating fuel usage rate 65 multiplied by frequency of occurrence 64 multiplied by number of hours in the year. Heating fuel usage rate 65 equals the amount of heat that needs to be produced to replace heat lost through the structure's envelope divided by HVAC system efficiency $\eta^{HVAC}$. Annual heating fuel consumption $Q^{Fuel}$ can be solved by integration when the temperature increment is small; the integration starts at a temperature of 0 degrees Rankine (° R), that is, absolute zero plus approximately −460° F., and ends when the outdoor temperature equals the heating season balance point temperature 67:

$$Q^{Fuel} = \int_{0° R}^{T^{Balance-Point}} \frac{UA^{Total}(T^{Balance-Point} - T^{Outdoor})f(T)(8760)dT}{\eta^{HVAC-Heating}} \quad (9)$$

where $\eta^{HVAC-Heating}$ is the efficiency of the HVAC system for heating.

The temperature frequency distribution function can be normalized by dividing by the cumulative frequency distribution evaluated from 0° R to the heating balance point temperature 67, that is, $F(T^{Heating\ Balance-Point})$:

$$\hat{f}(T) = \frac{f(T)}{F(T^{Balance-Point})} \quad (10)$$

Solve Equation (10) for f(T), substitute in Equation (9), and factor out constants:

$$Q^{Fuel} = \left[\frac{UA^{Total}F(T^{Balance-Point})(8760)}{\eta^{HVAC-Heating}}\right]\left[\int_{0° R}^{T^{Balance-Point}} (T^{Balance-Point} - T^{Outdoor})\hat{f}(T)dT\right] \quad (11)$$

The solution to the integration equals the balance point temperature 67 minus the outdoor temperature averaged up to the point where outdoor temperature equals the balance point temperature 67:

$$Q^{Fuel} = \frac{UA^{Total}(T^{Balance-Point} - \overline{T}^{Outdoor})(H)}{\eta^{HVAC-Heating}} \quad (12)$$

where H is the number of hours in the heating season.

Substitute Equation (5) into Equation (12) and simplify:

$$Q^{Fuel} = \frac{UA^{Total}(\overline{T}^{Indoor} - \overline{T}^{Outdoor})(H) - Q^{Internal}}{\eta^{HVAC-Heating}} \quad (13)$$

where $Q^{Internal}$ equals the overall internal gains 13 over the heating season.

Annual Fuel Consumption (Heating and Cooling Seasons)

A similar approach to forecasting the amount of fuel consumed during the cooling season and the results from the two seasons can be unified to provide a forecast of annual fuel consumption. Equation (13) is generalized by multiplying by the binary flag HeatOrCool. Internal gains 13 can then be factored out of the equation and converted to adjusted internal gains:

$$Q^{Fuel} = \frac{(HeatOrCool)(UA^{Total})(\overline{T}^{Indoor} - \overline{T}^{Outdoor})(H)}{\eta^{HVAC}} - Q^{Adj.Internal} \quad (14)$$

Equation (14) can be rearranged as:

$$Q^{Fuel} + Q^{Adj.Internal} = \frac{(HeatOrCool)(UA^{Total})(\overline{T}^{Indoor} - \overline{T}^{Outdoor})(H)}{\eta^{HVAC}} \quad (15)$$

Equation (15) corrects the assumption followed by the Degree Day approach that heating fuel consumption is linear with temperature for both heating and cooling situations, which clarifies that the sum of fuel consumption $Q^{Fuel}$ plus fuel representing adjusted internal gains $Q^{Adj.Internal}$ is linear with temperature.

The effects of changes to user preferences and building-specific parameters on heating and cooling fuel consumption are visually depictable with the approach taken by the Thermal Performance Forecast. FIG. 6 through FIG. 11 graph the cumulative effect of five separate investments on a building. As discussed supra with reference to FIG. 5, in each of these graphs, the x-axis 61 represents the temperature (in ° F.), the right-hand y-axis represents the value of the average daily temperature's frequency distribution (as a percentile), and the left-handy-axis represents fuel usage rate (in kW). In all of the graphs, there are two key characteristics that differentiate the Thermal Performance Forecast and the Degree Day approaches. First, as the result of each investment, the balance point temperatures may change. Similarly, the superimposed slopes of the plots of heating and cooling fuel usage rates may also change, while the distribution of the weather data remains the same.

The graphs demonstrate the cumulative effects of changes to different factors that affect the thermal conditioning of the building, including the structure's thermal conductivity $UA^{Total}$, desired indoor temperature $T^{Indoor}$ (treated as a value averaged over the applicable season), internal heating gains $Q^{Internal}$ (which results in a recalculation of adjusted internal gains $Q^{Adj.Internal}$), and HVAC system efficiency $\eta^{HVAC}$, and the forecast seasonal fuel consumption changes in light of each change. Referring first to the graph 70 in FIG. 6, the base thermal conditioning needs and annual (seasonal) fuel consumption for the building are shown. The balance point temperatures 71 are respectively 63° F. and 67° F. for heating and cooling with heating fuel usage rate 72 close to 10 kW at 25° F. and cooling fuel usage rate 73 of about 2.5 kW at 100° F. Referring next to the graph 80 in FIG. 7, a smart thermostat has been added with the result that the balance point temperature 81 for heating has been lowered to 61° F. while the balance point temperature 81 for cooling has been raised to 69° F. These changes result in new desired indoor temperatures that are treated as averaged values for purposes of forecasting seasonal fuel consumption. Referring next to the graph 90 in FIG. 8, triple heater efficiency has been added by converting from a fuel-based heater to heat pump-based heating. The balance point temperatures 91 and cooling fuel usage rate 93 remain unchanged, while the slope of the plot of heating fuel usage rate 92 has a dramatically flatter slope with the fuel usage rate being about 2.5 kW at 25° F. Referring next to the graph 100 in FIG. 9, double air conditioning efficiency has been added by integrating the air conditioning system with the heat pump. Here, the balance point temperatures 101 and heating fuel usage rate 102 remain unchanged, while the slope of the plot of cooling fuel usage rate 103 has a slope half as steep as before with a fuel usage rate of about 1.25 kW at 100° F. Referring next to the graph 110 in FIG. 10, the R-values of the building's walls and steps to reduce infiltration have been taken to provide double shell efficiency. Now, the balance point temperatures 111 for heating and cooling respectively are 56° F. and 64°. Finally, referring to the graph 120 of FIG. 11, half of the internal gains 13 within the building have been removed by reducing the heat generated by electrical appliances by improving the types of electrical devices, turning off unused or unneeded equipment, switching to LED lighting, and making other similar changes. The balance point temperatures 121 for heating and cooling respectively are 61° F. and 69° F. The higher balance point temperatures 121 was triggered by the need to make up for the decrease in existing heat within the building due to the reduction in internal gains 13.

To summarize, in contrast to the Degree Day approach, the Thermal Performance Forecast methodology separates weather data from user-preferences and building-specific parameters. This separation provides several benefits that include:
- Clear visual representation: the effects of building-related investments on heating and cooling fuel consumption are readily visualized.
- Simplified estimation of fuel consumption: Fuel consumption can be estimated under a wide range of scenarios using a simple equation.
- Observable parameters: Heating and cooling fuel consumption versus average daily temperature is directly observable.

Approximated Thermal Performance Forecast Approach

The Thermal Performance Forecast approach can be used to forecast heating and cooling fuel consumption based on changes to user preferences and building-specific parameters that include desired indoor temperature (specified by selecting a new temperature setting for the thermostat), building insulation, HVAC system efficiency, and internal heating gains. This section derives a simplified version of the analysis that is referred to as the Approximated Thermal Performance Forecast approach. Equation (14) forecasts fuel consumption based on a number of input variables for a building's properties that can also be used to predict future fuel consumption after energy consumption investment have been made.

Let '*' denote each existing input variable following a proposed change and assume that the changes do not affect the duration of the heating or cooling seasons, such that the average outdoor temperature remains unaffected. Future fuel consumption $Q^{Fuel*}$ can be predicted as follows:

$$Q^{Fuel*} = \frac{(HeatOrCool)(UA^{Total*})(\bar{T}^{*Indoor} - \bar{T}^{Outdoor})(H)}{\eta^{HVAC*}} - Q^{Adj.Internal*} \quad (16)$$

where $UA^{Total*}$ represents post-change thermal conductivity, $\bar{T}^{*Indoor}$ represents post-change average indoor temperature, $\eta^{HVAC*}$ represents post-change HVAC system efficiency, and $Q^{Adj.Internal*}$ represents post-change adjusted internal gains.

Next, define four ratio terms that express the relationships between the existing and post-change variables for the building properties and assume that none of the existing values would make the denominators equal zero, so that all of the ratios are well defined:

$$R^{UA} = \frac{UA^{Total*}}{UA^{Total}} \quad (17)$$

$$R^{Temp} = \frac{(\bar{T}^{*Indoor} - \bar{T}^{Outdoor})}{(\bar{T}^{Indoor} - \bar{T}^{Outdoor})}$$

$$R^{\eta} = \frac{\eta^{HVAC*}}{\eta^{HVAC}}$$

$$R^{Internal} = \frac{Q^{Internal*}}{Q^{Internal}}$$

Rearrange the terms in Equation (17):

$$UA^{Total*} = UA^{Total} R^{UA} \quad (18)$$

$$(\bar{T}^{*Indoor} - \bar{T}^{Outdoor}) = (\bar{T}^{Indoor} - \bar{T}^{Outdoor}) R^{Temp}$$

$$\eta^{HVAC*} = \eta^{HVAC} R^{\eta}$$

$$Q^{Internal*} = Q^{Internal} R^{Internal}$$

Divide $Q^{Internal*}$ by $\eta^{HVAC*}$ and multiply by the binary flag HeatOrCool to obtain $Q^{Adj.Internal*}$:

$$\frac{(HeatOrCool)(Q^{Internal*})}{\eta^{HVAC*}} = \quad (19)$$

$$\frac{(HeatOrCool)(Q^{Internal})R^{Internal}}{\eta^{HVAC}} = Q^{Adj.Internal*}$$

Next, substitute in $\eta^{HVAC*}$ from Equation (18):

$$Q^{Adj.Internal*} = \frac{(HeatOrCool)(Q^{Internal})R^{Internal}}{\eta^{HVAC} R^{\eta}} = \frac{Q^{Adj.Internal} R^{Internal}}{R^{\eta}} \quad (20)$$

$$\left(\frac{1}{R^{\eta}}\right):$$

Substitute Equations (18) and (20) into Equation (16) and factor out $$Q^{Fuel*} = \left[\frac{(HeatOrCool)(UA^{Total*})(\bar{T}^{Indoor} - \bar{T}^{Outdoor})(H)(R^{UA} R^{Temp})}{\eta^{HVAC}} - \right. \quad (21)$$

$$\left. Q^{Adj.Internal} R^{Internal}\right]\left(\frac{1}{R^{\eta}}\right)$$

Substitute in Equation (15):

$$Q^{Fuel^*} = [(Q^{Fuel} + Q^{Adj.Internal})R^{UA}R^{Temp} - Q^{Adj.Internal}R^{Internal}]\left(\frac{1}{R^\eta}\right) \quad (22)$$

Figure 12:
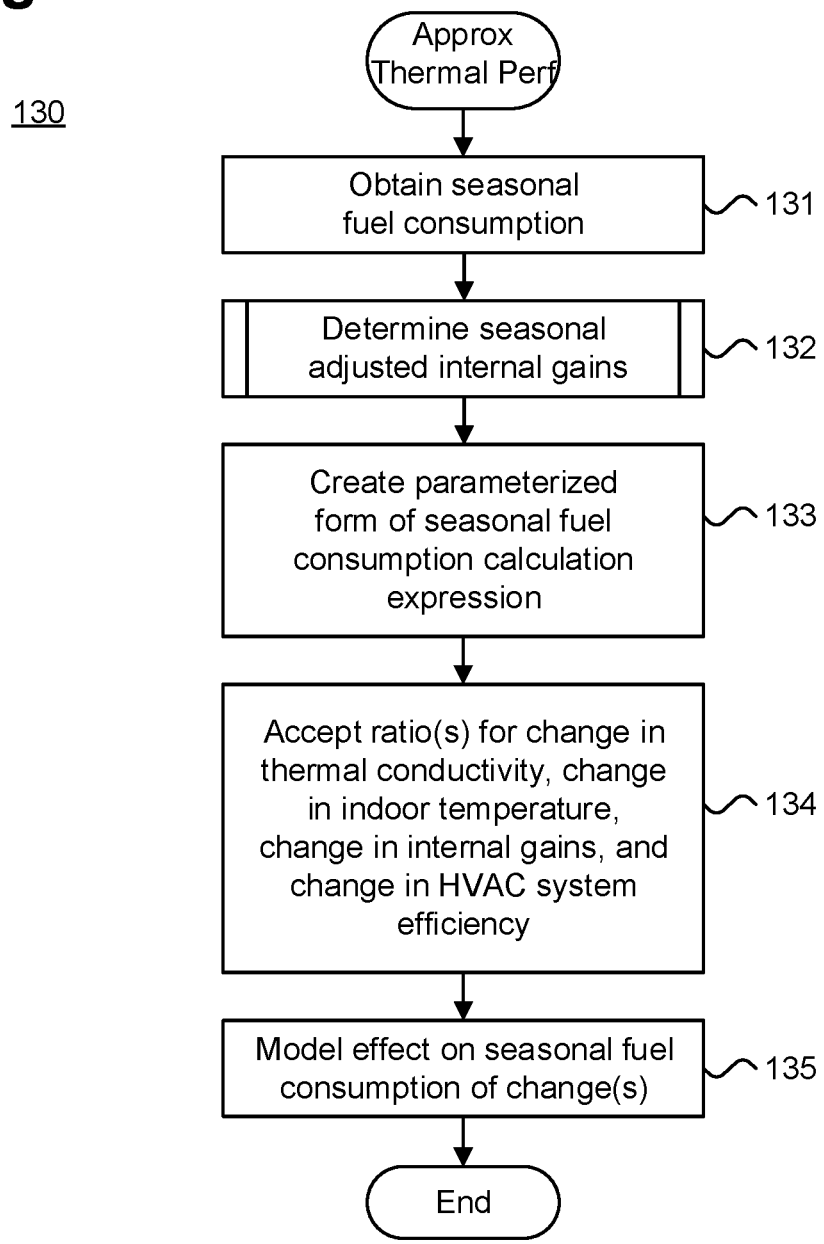
FIG. 12 is a flow diagram showing a method for forecasting seasonal fuel consumption for indoor thermal conditioning using the Approximated Thermal Performance Forecast approach with the aid of a digital computer in accordance with a further embodiment.

Equation (22) can be used for evaluating investments that affect heating (or cooling) fuel consumption. This equation predicts future heating (or cooling) fuel consumption based on existing heating (or cooling) fuel consumption, existing adjusted internal gains, as specified in Equation (7), and four ratios that express the relationship between the existing and post-change variables, as specified in Equation (17), can be set to 1 if no changes. FIG. 12 is a flow diagram showing a method 130 for forecasting seasonal fuel consumption for indoor thermal conditioning using the Approximated Thermal Performance Forecast approach with the aid of a digital computer in accordance with a further embodiment. Execution of the software can be performed with the assistance of a computer system, such as further described infra with reference to FIG. 23, as a series of process or method modules or steps.

Equation (22) has input six parameters. The amount of fuel consumed for the heating (or cooling) season and the adjusted internal gains for the season are required parameters; the four ratio terms that express the relationships between the existing and post-change variables for the building properties can be set to equal 1 if there are no changes to be made or evaluated. Setting the four ratio terms to equal 1 creates a parameterized form of Equation (22) into which changes to thermal conductivity, desired indoor temperature, internal heating gains, and the HVAC system efficiency can later be input to model their effects on seasonal fuel consumption. In addition, solving the parameterized form of Equation (22) with the four ratio terms equal to 1 allows a base seasonal fuel consumption value to be established, which is useful for comparisons during subsequent analysis of proposed changes.

Historical seasonal fuel consumption is first obtained (step 131) and can be measured, for example, directly from a customer's utility bills. Seasonal adjusted internal gains can be determined (step 132) using daily (or monthly) historical fuel consumption data combined with temperature data, as further described infra with reference to FIG. 15. A parameterized form of the seasonal fuel consumption calculation expression, Equation (22), is then created (step 133).

The effects on seasonal fuel consumption of proposed investments in the building or thermal conditioning equipment can now be modeled. One or more factors that represent a change in thermal conductivity, desired indoor temperature, internal heating gains, or HVAC system efficiency are accepted as input values (step 134). Each factor is expressed as a ratio term with the changed value over the base value. The seasonal heating and cooling fuel consumption is then forecast as a function of the historical fuel consumption, the adjusted internal gains, and the input ratio terms (step 135), as per Equation (22).

In a further embodiment, the creation of a parameterized form of Equation (22) and calculation of a base seasonal fuel consumption value can be skipped. Instead, one or more of the four ratio terms are populated with actual values that reflect a change in their respective properties, that is, those ratio terms do not equal 1, and are input directly into Equation (22) to forecast seasonal fuel consumption based on the one or more changes, albeit without the benefit of having a base seasonal fuel consumption value to compare.

EXAMPLE

As an example, consider an existing home that has a seasonal heating fuel consumption $Q^{Fuel}$ of 350 therms and existing adjusted internal gains $Q^{Adj.Internal}$ of 200 therms. The homeowner is contemplating a set of investments with multiple interacting effects that include:

Increasing insulation and reducing infiltration losses that results in a UA ratio $R^{UA}$ of 50 percent.

Installing a smart thermostat that reduces average indoor temperature from 68° F. to 66° F., so that the ratio of temperature rise over the average outdoor temperature $R^{Temp}$ of 54° F. is 86 percent.

Making other electric efficiency investments that reduce the internal gains 13, so that the internal gain ratio $R^{Internal}$ is 50 percent.

Installing a heat pump space heater that is four times as efficient as the existing heater, so that the HVAC ratio $R^\eta$ is 400 percent.

Inputting these assumptions into Equation (22) reflects a heating fuel consumption reduction from 350 therms to 34 therms:

$$Q^{Fuel^*} = [(350 \text{ therms} + 200 \text{ therms})(0.50)(0.86) - \quad (23)$$

$$(200 \text{ therms})(0.50)]\left(\frac{1}{4}\right) = 34 \text{ therms}$$

This set of investments is also reflected in the graphs of the cumulative effect of five separate investments on a building discussed supra with reference to FIG. 6 through FIG. 11.

Validation

Calculating the impact of a set of investments that have interrelated effects typically requires running a detailed model. From an investment analysis perspective, a simplified (but not simplistic) forecast could be beneficial. The simplifying assumption made in deriving Equation (22) was that the balance point temperature, and thus the length of the heating or cooling season, was not changed by the investments. This section assesses the effect of this simplifying assumption since certain types of investments will change the balance point temperature.

One way to make this assessment is to compare results from the Degree Day approach with the Approximated Thermal Performance Forecast approach under a range of scenarios for a sample house located in cities throughout the United States. The key assumptions for the scenarios are listed in Table 1. The values in the Base Case column are estimates for the sample house. The values in the Possible column correspond to what the values might be, given various investment alternatives and were selected to represent extreme values to verify model robustness.

TABLE 1

| Assumption | Base Case | Possible |
| --- | --- | --- |
| Winter Indoor Temperature | 70° F. | 66° F. |
| Summer Indoor Temperature | 70° F. | 72° F. |
| Heater Efficiency (or COP) | 80% | 320% |
| Air Conditioning SEER | 12 | 24 |
| Building Thermal Conductivity | 800 Btu/hr-° F. | 400 Btu/hr-° F. |
| Internal Gains | 3,912 Btu/hr | 1,956 Btu/hr |

Figure 13:
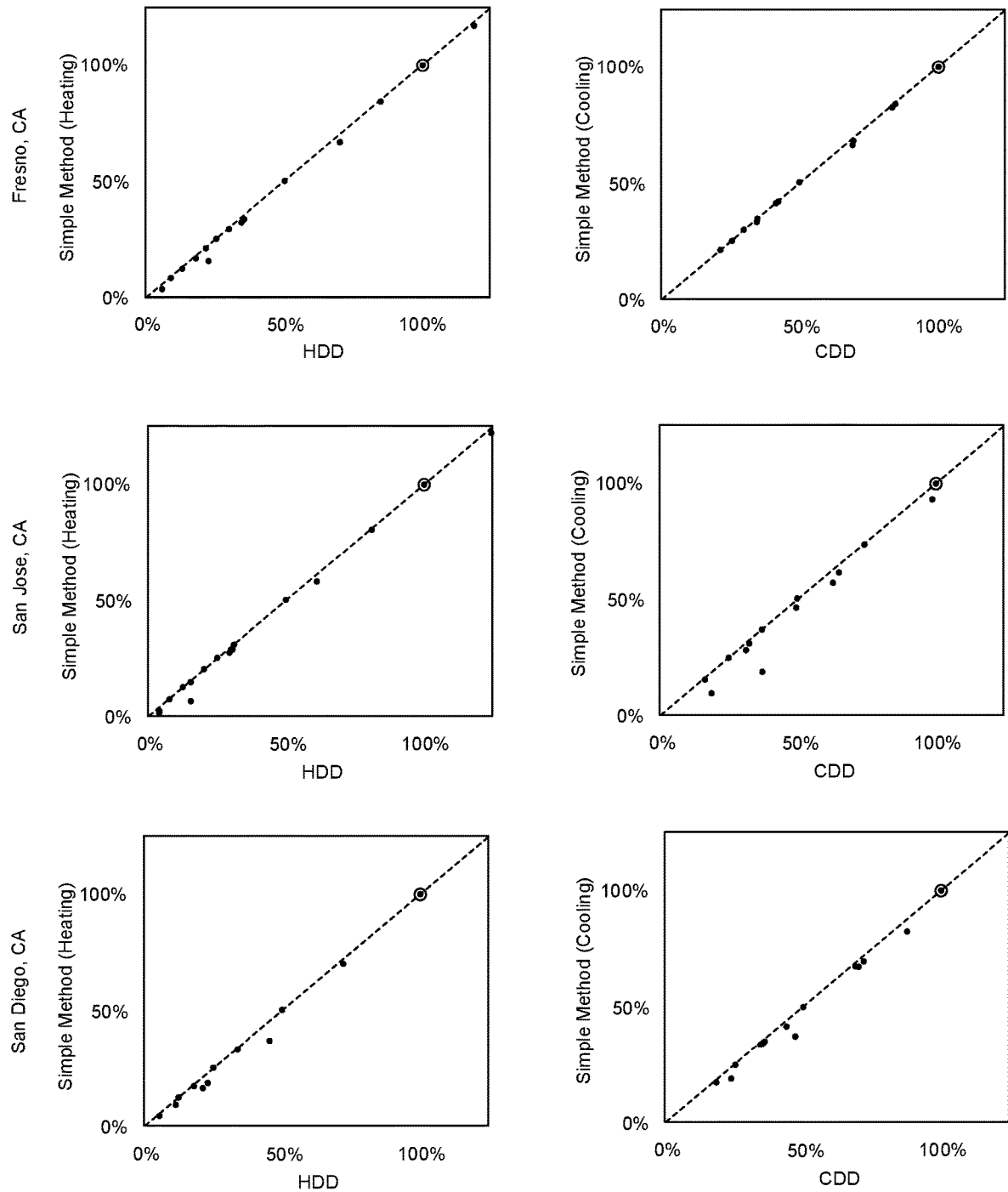
FIG. 13 is a set of graphs showing, by way of examples, normalized results for seasonal fuel consumption forecasts generated by the Approximated Thermal Performance Forecast and Degree Day approaches for five different cities.
Figure 13:
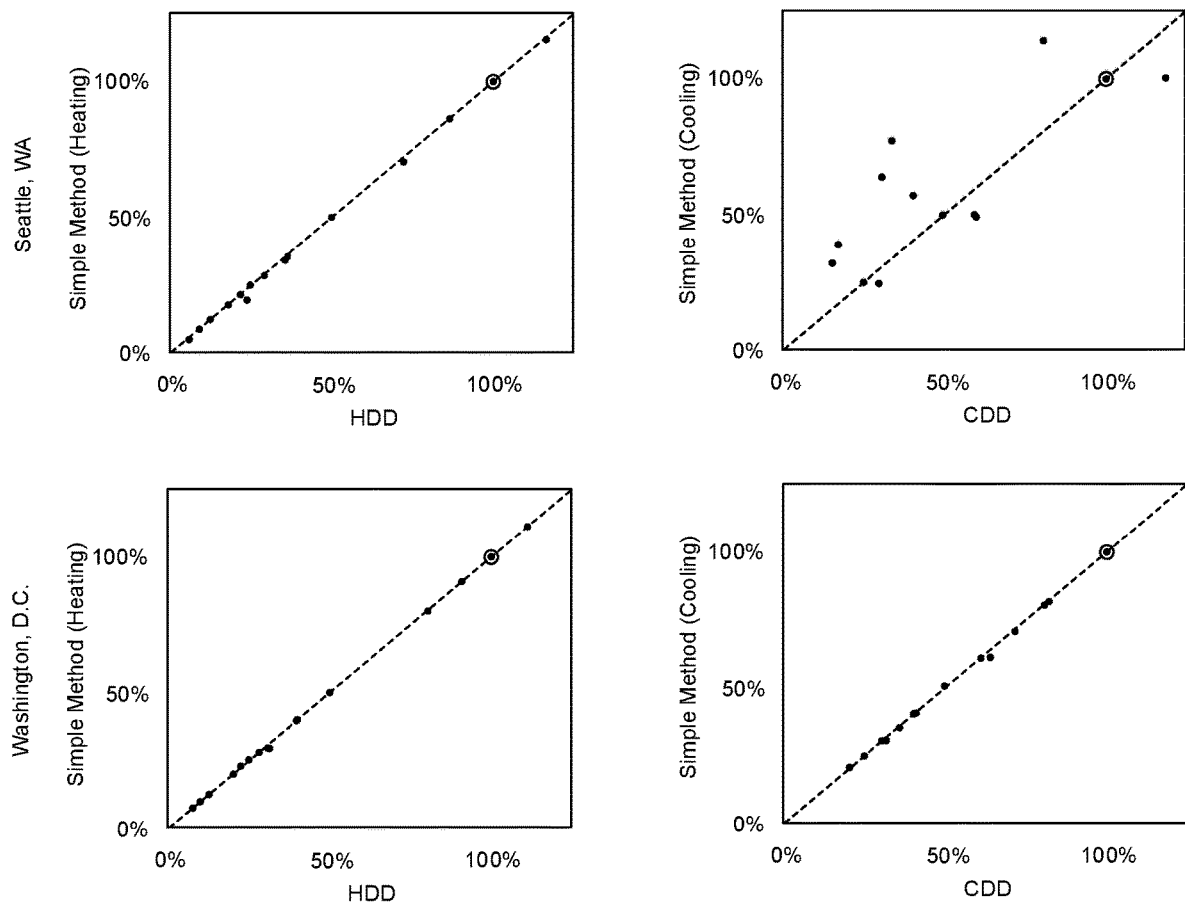

The Degree Day and Approximated Thermal Performance Forecasts approaches were run independently and all combinations of Base Case and Possible values were considered. For example, one scenario was to reduce the temperature in the winter by 4° F. from 70° F. to 66° F. Another scenario was to combine two investments that increased heater efficiency and reduced building thermal conductivity. In all, there were 64 possible combinations with 128 values for each location since each combination was run using the two approaches. FIG. 13 is a set of graphs showing, by way of examples, normalized results for seasonal fuel consumption forecasts generated by the Approximated Thermal Performance Forecast and Degree Day approaches for five different cities. The results are normalized to the base case Degree Day result. The y-axis corresponds to normalized results (as a percentile) for the Approximated Thermal Performance Forecast and the x-axis corresponds to normalized results for the Degree Day approach (as a percentile). For example, the base case Degree Day approach resulted in 78 MBtu being required for the 2015 heating season in Washington, D.C. All heating season results for Washington, D.C. for both methods are normalized to the Base Case Degree Day approach by dividing by 78 MBtu, which expresses the results in percentage terms.

All of the scenario results would be along the dashed line if both methods produced identical results. As depicted in the graphs, there is little difference between the Approximated Thermal Performance Forecast results versus the corresponding Degree Day results, even with major changes to the building, except for the cooling season in Seattle, where there is more error because cooling needs in Seattle are minimal. This results in magnification of percentage errors when expressed on a relative basis. Thus, the Approximated Thermal Performance Forecast approach provides a good estimate of the effect of investment changes relative to the Degree Day approach.

Observable Parameters

The Approximated Thermal Performance Forecast approach is based on observable input data that includes heating (or cooling) fuel consumption, and indoor and outdoor temperatures. In Equation (22), the amount of fuel consumed for heating (or cooling) $Q^{Fuel}$ and adjusted internal gains $Q^{Adj.Internal}$ are required parameters; the four remaining ratio parameters for change in thermal conductivity, change in indoor temperature, change in internal gains, and change in HVAC system efficiency can be set to equal 1 if there are no changes to be made or evaluated.

TABLE 2

| Parameters | Basic Parameters | All Parameters | Solar Gains | Model Verification | Thermal Mass |
| --- | --- | --- | --- | --- | --- |
| $Q^{Fuel}$ | ✓ | ✓ | ✓ | ✓ | ✓ |
| $Q^{Adj.\ Internal}$ | ✓ | ✓ | ✓ | ✓ | ✓ |
| Base value for $R^{UA}$ |  | ✓ | ✓ | ✓ | ✓ |
| Base value for $R^{Temp}$ | ✓ | ✓ | ✓ | ✓ | ✓ |
| Base value for $R^{Adj.\ Internal}$ |  | ✓ | ✓ | ✓ | ✓ |
| Base value for $R^{\eta}$ |  | ✓ | ✓ | ✓ | ✓ |
| Thermal Mass |  |  |  |  | ✓ |
| Input Data |  |  |  |  |  |
| Est. or Meas. HVAC Eff. (%) |  | Yes | Yes | Yes | Yes |
| Fuel Consumption (kWh) | Daily | Daily | Daily | Daily | Daily |
| Avg. Outdoor Temp. (° F.) | Daily | Daily | Daily | Daily | Daily |
| Avg. Indoor Temp. (° F.) | Seasonal | Seasonal | Seasonal | Daily | Daily |
| Avg. Number of Occupants |  |  | Seasonal | Seasonal | Seasonal |
| Avg. Internal Electric (kW) |  |  | Seasonal | Daily | Daily |
| Avg. Irradiance (kW/m²) |  |  | Seasonal | Daily | Daily |
| Beginning Indoor Temp. (° F.) |  |  |  |  | Daily |

This section describes how to calculate the two required parameters based on the available input data. Table 2 lists the parameters that can be calculated based on the input data. Note that for the input data for fuel consumption, monthly fuel can be used in place of daily fuel if daily HVAC fuel consumption is not available. The calculations will be illustrated using data from the 2015-2016 heating season from Nov. 1, 2015 to Mar. 31, 2016 for an efficient home located in Napa, Calif.

Basic Parameters

Figure 14:
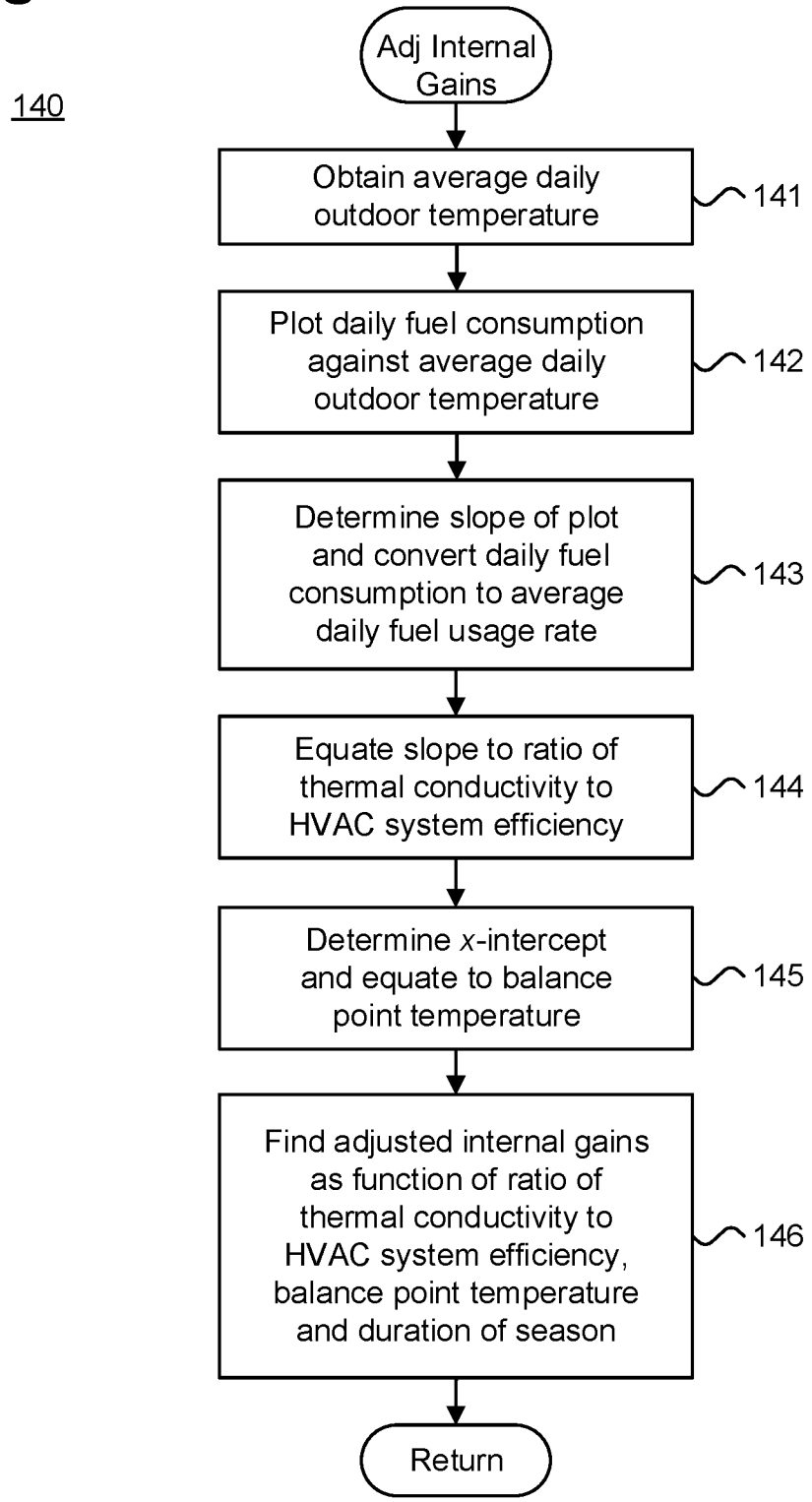
FIG. 14 is a flow diagram showing a routine for determining adjusted internal gains for use with the method of FIG. 12.

The amount of fuel consumed for the heating season (or cooling season) $Q^{Fuel}$ and adjusted internal gains $Q^{Adj.Internal}$ are required parameters in Equation (22). Adjusted internal gains $Q^{Adj.Internal}$ can be calculated using daily (or monthly) historical fuel consumption data combined with average daily outdoor temperature. FIG. 14 is a flow diagram showing a routine 140 for determining adjusted internal gains for use with the method 120 of FIG. 12. As with the Thermal Performance Forecast approach, discussed supra, the average daily outdoor temperatures are obtained (step 141). The daily fuel consumption is plotted against the average daily outdoor temperature (step 142). The slope of the plot is determined and divided by 24 hours to convert daily fuel consumption to average daily fuel usage rate (step 143). The converted slope equates to the ratio of thermal conductivity over HVAC system efficiency, that is, $$\frac{UA^{Total}}{\eta^{HVAC}}$$

(step 144). The x-intercept of the plot is also determined, which equates to the balance point temperature (step 145), assuming that the internal gains 13 are constant across the temperature range. Finally, the adjusted internal gains $Q^{Adj.Internal}$ are determined (step 146), per Equation (7), as a function of the applicable season (by setting the binary flag HeatOrCool to 1 for heating season and −1 for cooling season), the ratio $$\frac{UA^{Total}}{\eta^{HVAC}},$$

the average indoor temperature over the applicable season $T^{Indoor}$, the balance point temperature $T^{Balance-Point}$, and the duration of the season H (in hours).

Figure 15:
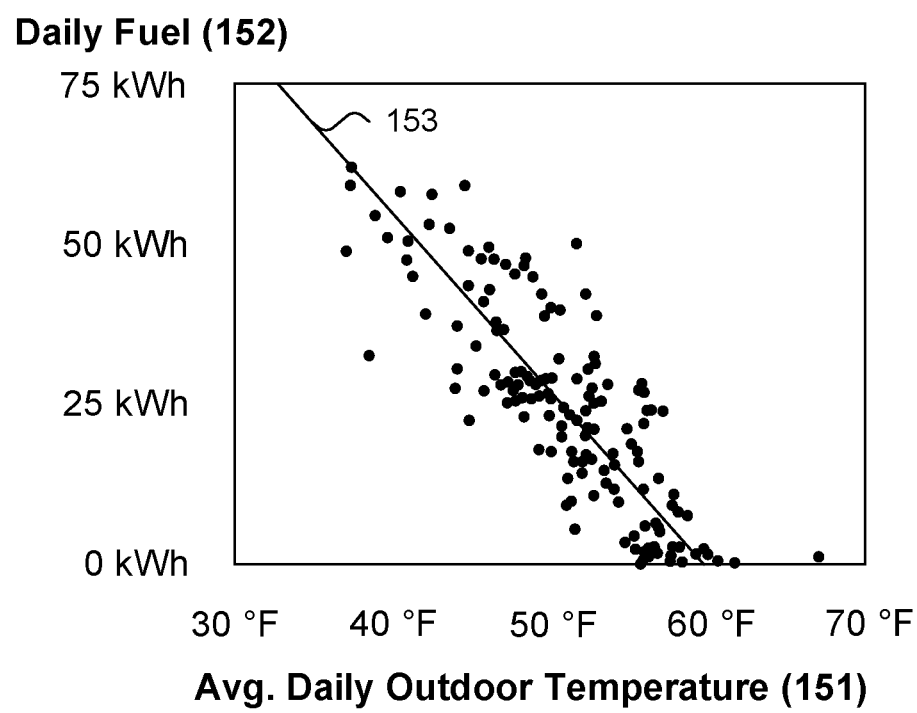
FIG. 15 is a graph showing, by way of example, daily heating fuel consumption versus average outdoor temperature for the heating season for the efficient house.

An example can help illustrate the derivation of the adjusted internal gains. FIG. 15 is a graph 150 showing, by way of example, daily heating fuel consumption versus average outdoor temperature for the heating season for the efficient house. The x-axis 151 represents the average daily outdoor temperature (in ° F.). The y-axis 152 represents daily fuel consumption (in kWh per day). The slope of the plot 153, when converted to a fuel usage rate by dividing by 24 hours in a day, is 0.115 kW per ° F. and the x-intercept is 60° F. Using Equation (7), the adjusted internal gains $Q^{Adj.Internal}$ can be calculated as follows. Assume that the average indoor temperature was 68° F. The heating season, that is, HeatOrCool equals 1, had 3,648 hours with an average outdoor temperature of 51.1° F. Seasonal heating fuel consumption can be calculated by summing the daily values, which equaled 3,700 kWh for the sample home. Inputting these values into Equation (7) yields:

$$Q^{Adj.Internal} = (1)\left(0.115\frac{kW}{°F}\right)(68° - 60°)(3,648 \text{ h}) = 3,350 \text{ kWh} \quad (24)$$

Thus, the adjusted internal gains $Q^{Adj.Internal}$ is 3,350 kWh. Note that HVAC system efficiency $\eta^{HVAC}$ is not required for this calculation. Where there are large daily variations from the average indoor temperature, such as occurs in an office building that is unoccupied and unheated during weekends and holidays, the season can be defined to exclude weekend and holiday data.

With the two parameters, $Q^{Fuel}$ and $Q^{Adj.Internal}$ a parameterized form of Equation (22) for determining predicted seasonal fuel consumption $Q^{Fuel*}$ for this particular house is:

$$Q^{Fuel*} = [(3,700 \text{ kWh} + 3,350 \text{ kWh})R^{UA}R^{Temp} - \quad (25)$$
$$(3,350 \text{ kWh})R^{Internal}]\left(\frac{1}{R^\eta}\right)$$

Now, future fuel consumption $Q^{Fuel*}$ can now be predicted by inputting information about the four ratios, the change in thermal conductivity ratio $R^{UA}$, the change in indoor temperature ratio $R^{Temp}$, the change in internal gains ratio $R^{Internal}$, and the change in HVAC system efficiency ratio $R^\eta$. Suppose, for example, that a consumer wants to evaluate the effect of reducing the building's thermal conductivity by 50 percent, but everything else remains the same. Evaluating Equation (25) with a thermal conductivity ratio $R^{UA}$ of 0.5 yields:

$$Q^{Fuel*} = [(7,050 \text{ kWh})(0.5)(1) - (3,350 \text{ kWh})(1)]\left(\frac{1}{1}\right) = 175 \text{ kWh} \quad (26)$$

Thus, future fuel consumption $Q^{Fuel*}$ would be 175 kWh, falling from 3,700 kWh before the investment.

All Parameters

The previous section described how to calculate the two required input parameters to Equation (22), seasonal fuel consumption $Q^{Fuel}$ and adjusted internal gains $Q^{Adj.Internal}$. The section also described the base information needed to calculate the effect of a change in average indoor temperature. The base value for the ratio term for the indoor temperature $R^{Temp}$ is simply $(T^{Indoor} - T^{Outdoor})$.

The base values for the remaining three ratio terms, change in the thermal conductivity of the building $R^{UA}$, change in the internal gains within the building $R^{Internal}$, and change in the HVAC system efficiency $R^\eta$, can be calculated if the HVAC system efficiency $\eta^{HVAC}$ is specified. HVAC system efficiency $\eta^{HVAC}$ can either be estimated or measured using an empirical test, such as described in commonly-assigned U.S. Pat. No. 10,339,232, cited supra. The base value for the ratio term for the change in thermal conductivity $R^{UA}$ can be calculated by multiplying the ratio of thermal conductivity over HVAC system efficiency $$\frac{UA^{Total}}{\eta^{HVAC}},$$

such as determined by plotting average daily fuel usage rate versus the average daily outdoor temperature, as described supra with reference to FIG. 14, by $\eta^{HVAC}$. The base value for the ratio term for the change in internal gains $R^{Internal}$ can be calculated by multiplying adjusted internal gains $Q^{Adj.Internal}$ by the HVAC system efficiency $\eta^{HVAC}$. Finally, the base value for the ratio term for the change in HVAC system efficiency $R^\eta$ is simply the HVAC system efficiency $\eta^{HVAC}$. For the sample home, the heating efficiency equals 100 percent since electric baseboard heating is used. Thermal conductivity $UA^{Total}$ equals 0.115 kW/° F., average internal gains $Q^{Internal}$ equals 0.918 kW, and HVAC system efficiency $\eta^{HVAC}$ equals 100 percent.

Solar Gains

Solar gains $Q^{Solar}$ can be difficult to measure. Here, the sample home had average internal gains from electricity $Q^{Electric}$ of 0.302 kW and average solar radiation of 0.115 kW/m². The building averaged two occupants that had heat gains of 0.147 kW. Inputting these values into Equation (3) yields:

$$W = \frac{0.918 \text{ kW} - (0.302 \text{ kW} + 0.147 \text{ kW})}{0.115\frac{kW}{m^2}} = 4.1 \text{ m}^2 \quad (27)$$

Thus, the effective window area W is about 4.1 m².

Suppose that the consumer is considering whether to replace existing windows with passive solar windows that will double the transmissivity to increase solar gains. The passive solar windows have the same R-value as the existing windows. Current solar gains equal $$(4.1 \text{ m}^2)\left(0.115 \frac{\text{kWh}}{\text{m}^2}\right) = 0.472 \text{ kW.}$$

Predicted solar gains would be $$(8.2 \text{ m}^2)\left(0.115 \frac{\text{kWh}}{\text{m}^2}\right) = 0.944 \text{ kW.}$$

As a result, the internal gains ratio $R^{Internal}$ will equal $$\frac{(0.302 \text{ kW} + 0.147 \text{ kW} + 0.472 \text{ kW}) + 0.472 \text{ kW}}{(0.302 \text{ kW} + 0.147 \text{ kW} + 0.472 \text{ kW})} =$$

$$\frac{0.921 \text{ kW} + 0.472 \text{ kW}}{0.921 \text{ kW}} = 1.51.$$

Set the internal gains ratio $R^{Internal}$ in Equation (25) to 1.51 and set all other ratios equal to 1:

$$Q^{Fuel*} = 7,050 \text{ kWh} - (3,350 \text{ kWh})(1.51) = 1,991 \text{ kWh} \quad (28)$$

Thus, the passive solar windows would reduce future fuel consumption $Q^{Fuel*}$ from 3,600 kWh to 1,991 kWh.

Model Verification

In the foregoing discussion, internal gains from electricity $Q^{Electric}$ and internal gains from occupants $Q^{Occupants}$ have been assumed to be constant and internal solar gains $Q^{Solar}$ have been assumed to be proportional to irradiance.

Figure 16:
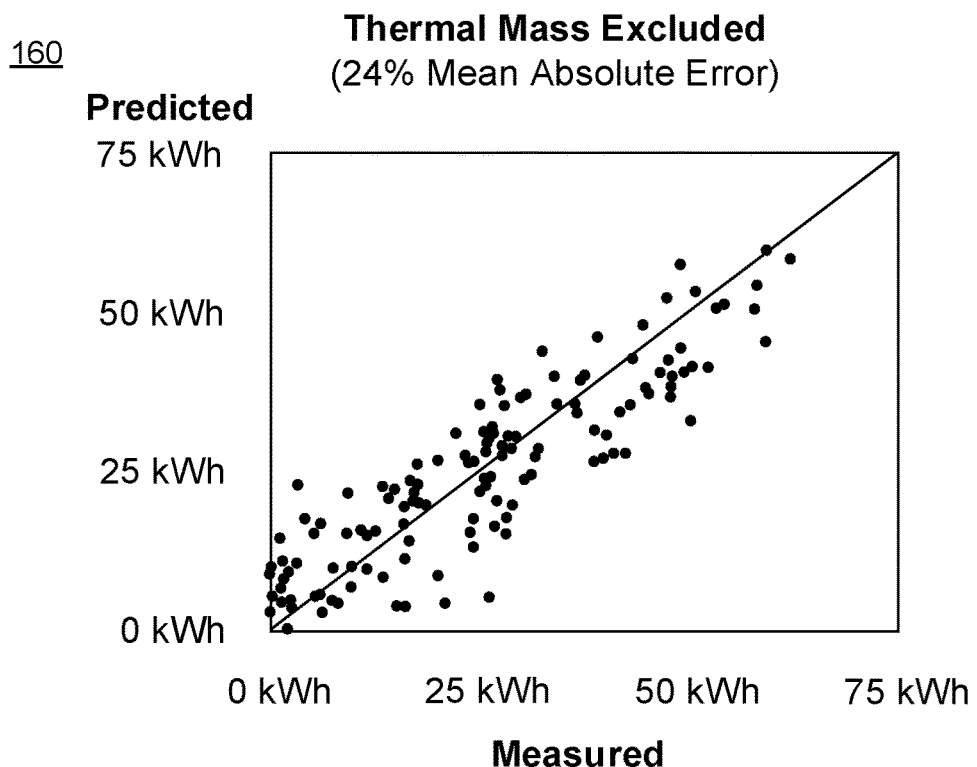
FIG. 16 is a graph showing, by way of example, predicted versus measured daily fuel consumption for the efficient house with thermal mass excluded.
Figure 17:
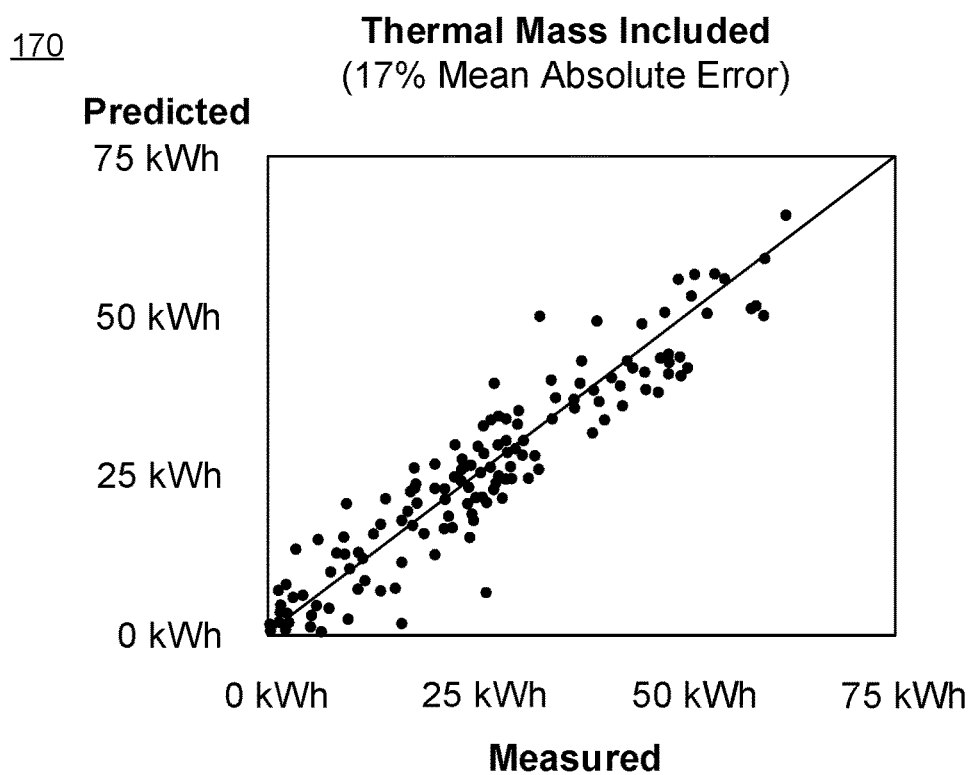
FIG. 17 is a graph showing, by way of example, predicted versus measured daily fuel consumption for the efficient house with thermal mass included.

These assumptions can be verified if daily internal electric and irradiance data are available. For the sample building, this data was fed into an optimization program to solve for the thermal conductivity $UA^{Total}$ and balance point temperature. Here, the thermal conductivity was 0.109 kW/° F. and the balance point temperature was 60.3° F. FIG. 16 and FIG. 17 are graphs 160, 170 showing, by way of example, predicted versus measured daily fuel consumption for the efficient house with thermal mass respectively excluded and included. In both graphs, the x-axis represents measured daily fuel consumption (in kWh). The y-axis represents predicted fuel consumption (in kWh). In the graph 160 of FIG. 16, the daily predicted fuel consumption was determined using Equation (16). In the graph 170 of FIG. 17, the daily effect of thermal mass M was factored in using Equation (8) to add adjusted internal gains $Q^{Adj.Internal}$ (on a daily basis), after which the optimization was repeated. Here, the sample home had a thermal conductivity $UA^{Total}$ of 0.116 kW/° F., balance point temperature of 59.8° F., and thermal mass M of 4.187 kWh/° F. FIG. 18 is a graph 180 showing, by way of example, predicted versus measured daily fuel consumption for the efficient house over time. The x-axis represents each day over a five-month period. The y-axis represents measured daily fuel consumption (in kWh per day). The measured and predicted fuel consumption values are fairly well correlated throughout the time period.

Inclusion of thermal mass M is beneficial from several perspectives. First, in the situation of the sample home, including thermal mass M reduces error by about one-third. Second, the inclusion of thermal mass M is likely to increase accuracy of results for the input parameters. Finally, thermal mass is a key input parameter in optimizing HVAC system efficiency, such as described in commonly-assigned U.S. Pat. No. 10,203,674, issued Feb. 12, 2019, the disclosure of which is incorporated by reference. The foregoing approach presents a way to calculate thermal mass M with only utility consumption, indoor temperature data, outdoor temperature data, and HVAC system efficiency inputs are required parameters.

Example for Inefficient House

Consider another example using data from an inefficient house in Napa, Calif. over the same time period of the 2015-2016 heating season. Weekends were excluded because the house was used for business purposes only. The average indoor temperature was 64.3° F. with 2,472 hours in the heating season (with weekends excluded). Historical utility bills show that fuel consumption was 13,100 kWh. HVAC heater efficiency was assumed to be 80 percent.

TABLE 3

|  | Basic Parameters | Solar Gains | Thermal Mass |
|---|---|---|---|
| Balance Point Temp. | 61° F. | 60.8° F. | 60.4° F. |
| Thermal Conductivity | 0.513 kW/° F. | 0.518 kW/° F. | 0.519 kW/° F. |
| Effective Window Area | N/A | 5.9 m² | 7.5 m² |
| Thermal Mass | N/A | N/A | 10.486 kWh/° F. |
| MAE Error | N/A | 24% | 14% |

Figure 20:
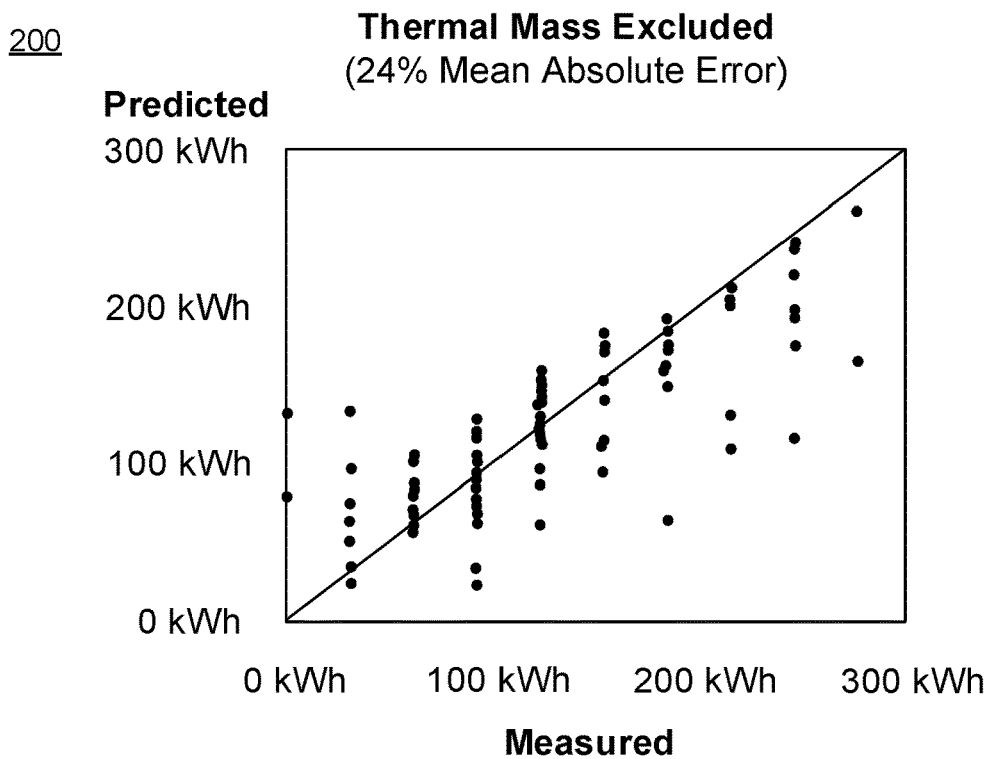
FIG. 20 is a graph showing, by way of example, predicted versus measured daily fuel consumption for the inefficient house with thermal mass excluded.
Figure 21:
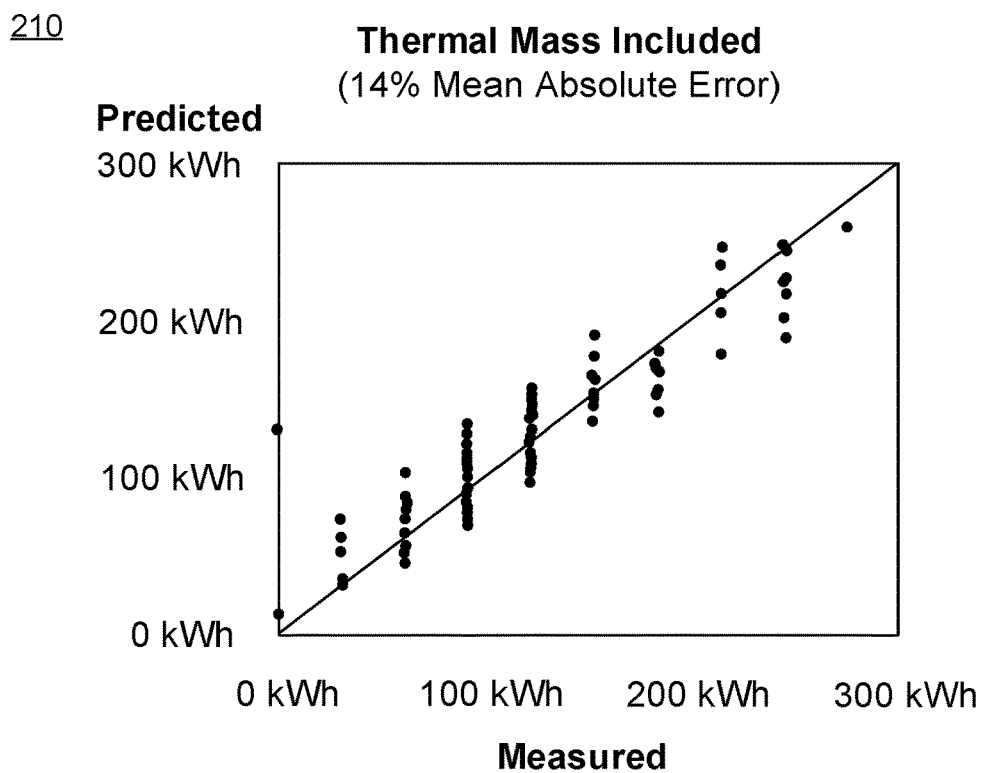
FIG. 21 is a graph showing, by way of example, predicted versus measured daily fuel consumption for the inefficient house with thermal mass included.
Figure 22:
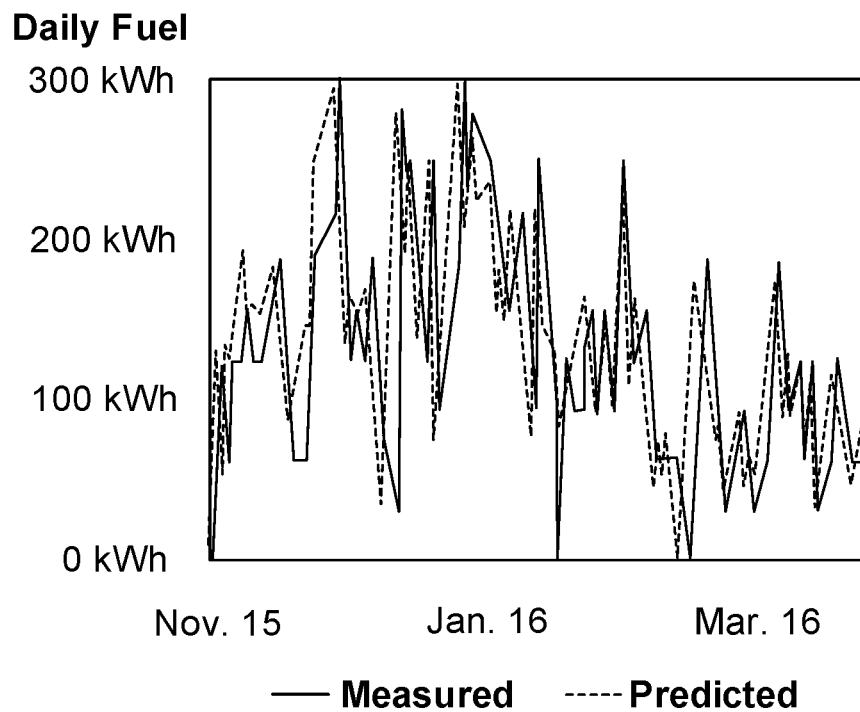
FIG. 22 is a graph showing, by way of example, predicted versus measured daily fuel consumption for the inefficient house over time.

Table 3 presents the results. In addition, FIG. 19 is a graph 190 showing, by way of example, daily heating fuel consumption versus average outdoor temperature for the heating season for the inefficient house. The x-axis 131 represents the average daily outdoor temperature (in ° F.). The y-axis 132 represents daily fuel consumption (in kWh). Similarly, FIG. 20 and FIG. 21 are graphs 200, 210 showing, by way of example, predicted versus measured daily fuel consumption for the inefficient house with thermal mass respectively excluded and included. In both graphs, the x-axis represents measured daily fuel consumption (in kWh per day). The y-axis represents predicted fuel consumption (in kWh per day). Finally, FIG. 22, is a graph 220 showing, by way of example, predicted versus measured fuel consumption for the efficient house over time. The x-axis represents month. The y-axis represents daily fuel consumption (in kWh). As with the efficient house, discussed supra with reference to FIG. 15 through FIG. 18, the measured and predicted fuel consumption values are fairly correlated throughout the time period.

For the inefficient house, adjusted internal gains $Q^{Adj.Internal}$ equal 6,250 kWh:

$$Q^{Adj.Internal} = \left(0.649 \frac{\text{kW}}{°F}\right)(64.3° - 60.4°)(2,472 \text{ h}) = 6,250 \text{ kWh} \quad (29)$$

Projected fuel consumption can be estimated to reflect the effect of new investments by inputting the adjusted internal gains $Q^{Adj.Internal}$ (6,250 kWh) and heating fuel consumption (13,100 kWh) into Equation (22):

$$Q^{Fuel*} = [(19,350 \text{ kWh})R^{UA}R^{Temp} - (6,250 \text{ kWh})R^{Internal}]\left(\frac{1}{R^\eta}\right) \quad (30)$$

Energy Consumption Modeling System

Figure 23:
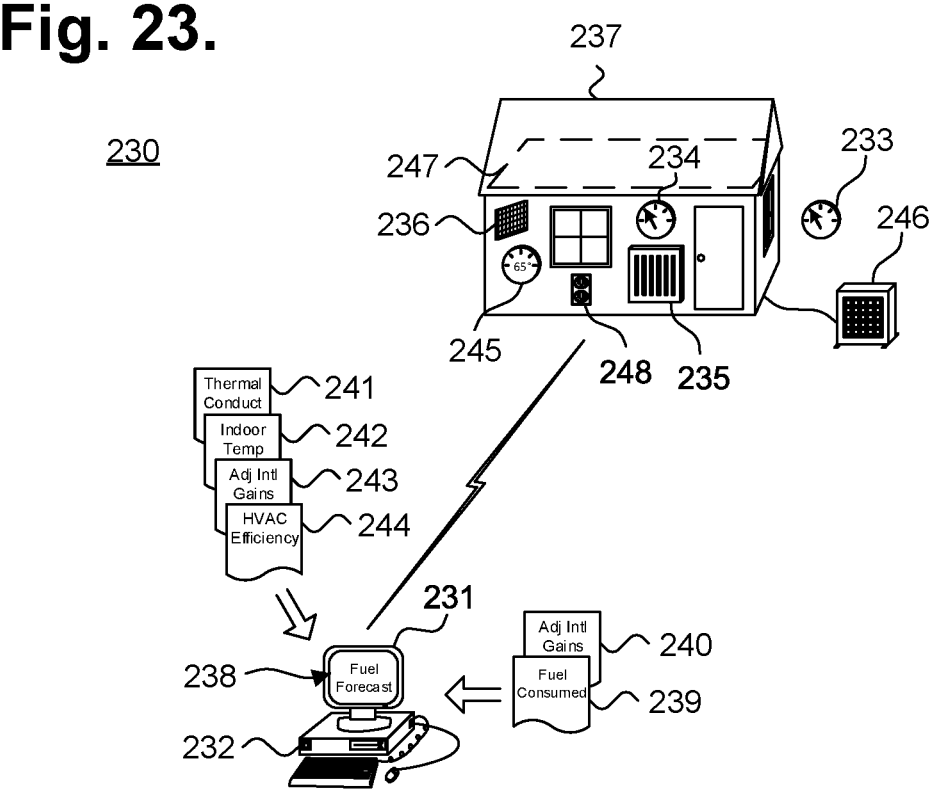
FIG. 23 is a system for forecasting seasonal fuel consumption for indoor thermal conditioning with the aid of a digital computer in accordance with one embodiment.

Forecasting seasonal fuel consumption for indoor thermal conditioning, as well as changes to the fuel consumption triggered by proposed investments in the building or thermal conditioning equipment with the Thermal Performance Forecast and Approximated Thermal Performance Forecast approaches can be performed with the assistance of a computer, or through the use of hardware tailored to the purpose. FIG. 23 is a system 230 for forecasting seasonal fuel consumption for indoor thermal conditioning with the aid of a digital computer in accordance with one embodiment. A computer system 231, such as a personal, notebook, or tablet computer, as well as a smartphone or programmable mobile device, can be programmed to execute software programs 232 that operate autonomously or under user control, as provided through user interfacing means, such as a monitor, keyboard, and mouse. The computer system 231 includes hardware components conventionally found in a general purpose programmable computing device, such as a central processing unit, memory, input/output ports, network interface, and non-volatile storage, and execute the software programs 232, as structured into routines, functions, and modules. In addition, other configurations of computational resources, whether provided as a dedicated system or arranged in client-server or peer-to-peer topologies, and including unitary or distributed processing, communications, storage, and user interfacing, are possible.

For the Thermal Performance Forecast approach, the computer system 231 needs data on the average daily outdoor temperatures 233 and the balance point temperatures 234 for the heating 235 and cooling 236 seasons for the building 237. The computer system 231 executes a software program 232 to determine seasonal (annual) fuel consumption 238 using the Thermal Performance Forecast approach, described supra with reference to FIG. 3 et seq.

For the Approximated Thermal Performance Forecast approach, the computer system 231 needs the amount of fuel consumed for heating (or cooling) $Q^{Fuel}$ 239 and adjusted internal gains $Q^{Adj.Internal}$ 240 for the heating 235 and cooling 236 seasons for the building 237. The remaining base values for thermal conductivity 241, indoor temperature 242, adjusted internal gains 243, and HVAC system efficiency 244 can then be calculated. The computer system 231 executes a software program 232 to determine seasonal (annual) fuel consumption 238 using the Approximated Thermal Performance Forecast approach described supra with reference to FIG. 12 et seq.

Applications

The two approaches, the Thermal Performance Forecast and the Approximated Thermal Performance Forecast, to estimating fuel consumption for heating (or cooling) on an annual or seasonal basis provide a powerful set of tools that can be used in various applications. A non-exhaustive list of potential applications will now be discussed. Still other potential applications are possible.

Application to Thermal Conditioning Analysis

The derivation of adjusted internal gains, effective window area, and fuel consumption can have applicability outside the immediate context of seasonal fuel consumption forecasting. Fundamental building thermal property parameters, including thermal conductivity $UA^{Total}$, effective window area W, and thermal mass M, that are key input values to various methodologies for evaluating thermal conditioning costs and influences can all be determined using at most utility consumption, outdoor temperature data, indoor temperature data, and HVAC system efficiency as inputs. For instance, these parameters can be input into time series modelling approaches to forecast hourly fuel consumption, such as described in commonly-assigned U.S. Pat. No. 10,339,232, cited supra.

Quantifying a building's thermal conductivity remains a non-trivial task. A building's thermal conductivity can be estimated through an energy audit or empirically determined through a short-duration controlled test. Alternatively, the ratio of thermal conductivity over HVAC system efficiency $$\frac{UA^{Total}}{\eta^{HVAC}},$$

as reflected by the slope of a plot of average daily fuel usage rate versus average daily outdoor temperatures over a season, as discussed supra with reference to FIG. 14, can be used to quantify thermal conductivity $UA^{Total}$ without any audit or empirical testing required, provided that HVAC system efficiency is known.

Similarly, effective window area W is the dominant means of solar gain in a typical building during the winter and includes the effect of physical shading, window orientation, the window's solar heat gain coefficient, as well as solar heat gain through opaque walls and roofs. Quantifying effective window area W typically requires physically measuring vertical, south-facing window surfaces or can be empirically determined through a series of sequentially-performed short duration tests. Alternatively, per Equation (3), the effective window area W can be calculated based on overall internal gains $Q^{Internal}$ internal gains from electricity $Q^{Electric}$, internal gains from occupants $Q^{Occupants}$, and the available solar resource Solar, again without any audit or empirical testing required.

Thermal mass can be estimated by selecting the thermal mass that reduces the error between predicted and measured fuel consumption, as illustrated in FIG. 16 and FIG. 17, and in FIG. 20 and FIG. 21. This derivation of thermal mass avoids an on-site visit or special control of the HVAC system.

Application to Homeowners

Both of the approaches are especially useful to homeowners and the average consumer due to their intuitive appeal. By keeping weather data separate from user preferences and building-specific parameters, the Thermal Performance Forecast approach permits the effects of proposed investments in the building or thermal conditioning equipment to be visualized with the impact of those investments on fuel consumption readily apparent. The Approximated Thermal Performance approach allows changes to thermal conductivity, indoor temperature, internal gains, and HVAC system efficiency to be modeled with only two input parameters, the amount of fuel consumed for the heating season (or cooling season) $Q^{Fuel}$ and the adjusted internal gains $Q^{Adj.Internal}$. As discussed supra with reference to Table 1, these four changes respectively correlate, for instance, to popular energy-saving investments that include:

Smart thermostat (245): reduce indoor temperature in the winter; increase indoor temperature in the summer.

Electric heat pump (246): convert from a natural gas heater to an electric heat pump to increase heater efficiency.

Increased insulation and improved building sealing (247): reduce building thermal conductivity.

Improved appliances (248): reduce internal gains by making energy efficiency investments in improved appliances.

The first three investments reduce fuel consumption. The energy efficiency investments increase heating fuel consumption and reduce air conditioning fuel consumption by reducing internal gains.

Application to Building Shell Investment Valuation

The economic value of heating (and cooling) energy savings associated with any building shell improvement in any building has been shown to be independent of building type, age, occupancy, efficiency level, usage type, amount of internal electric gains, or amount solar gains, provided that fuel has been consumed at some point for auxiliary heating.

While the invention has been particularly shown and described as referenced to the embodiments thereof, those skilled in the art will understand that the foregoing and other changes in form and detail may be made therein without departing from the spirit and scope.

The invention claimed is:

1. A system for plot-based forecasting of building seasonal fuel consumption for indoor thermal conditioning with the aid of a digital computer, comprising:
    a processor configured to execute code, the processor configured to:
        obtain historical daily fuel consumption for thermal conditioning of a building during a time period;
        identify internal gains within the building over the time period;
        determine adjusted internal gains for the building using a plot, comprising:
            obtain average daily outdoor temperatures over the time period;
            generate the plot of the historical daily fuel consumption averaged on a daily basis versus the average daily outdoor temperatures over the time period;
            determine the slope of the plot, convert the slope into average daily fuel usage rate by dividing the slope by 24, and equate the converted slope of the plot to the ratio of thermal conductivity over an efficiency of an HVAC system that provides the thermal conditioning to the building; and
            equate the x-intercept of the plot to a balance point temperature for the building; and
        evaluate the adjusted internal gains as a function of the ratio of thermal conductivity over HVAC system efficiency, difference between average indoor temperature and the balance point temperature, and the duration of the time period; and
        forecast seasonal fuel consumption for the building associated with a change to the building using the historical daily fuel consumption and the adjusted internal gains.

2. A system according to claim 1, the processor further configured to:
    obtain weekends and holidays in a season; and
    define the time period comprising excluding the weekends and the holidays from the season.

3. A system according to claim 2, wherein the building is used for business purposes.

4. A system according to claim 1, wherein the change to the building comprises a change to one or more appliances within the building.

5. A system according to claim 1, wherein the change to the building affects the HVAC system efficiency.

6. A system according to claim 1, wherein the change to the building comprises at least one of an installation of or a change to an operation of a smart thermostat.

7. A system according to claim 1, the processor further configured to:
    determine base seasonal fuel consumption $Q^{Fuel*}$ for the building in accordance with:

$$Q^{Fuel*} = [(Q^{Fuel} + Q^{Adj.Internal})R^{UA}R^{Temp} - Q^{Adj.Internal}R^{Internal}]\left(\frac{1}{R^\eta}\right)$$

where $Q^{Fuel}$ is the historical fuel consumption, $Q^{Adj.Internal}$ is the adjusted internal gains, $R^{UA}$ is the change in the thermal conductivity ratio, $R^{Temp}$ is the change in indoor temperature ratio, $R^{Internal}$ is the change in the internal gains ratio, $R^\eta$ is the change in the HVAC system efficiency ratio, and $R^{UA}=R^{Temp}=R^{Internal}=R^\eta=1$.

8. A system according to claim 1, the processor further configured to:
    obtain historical daily fuel consumption using one or more utility bills associated with the building.

9. A system according to claim 1, wherein the change is performed based on the forecast.

10. A method for plot-based forecasting of building seasonal fuel consumption for indoor thermal conditioning with the aid of a digital computer, comprising steps of:
    obtaining historical daily fuel consumption for thermal conditioning of a building during a time period using one or more utility bills associated with the building;
    identifying internal gains within the building over the time period;
    determining adjusted internal gains for the building using a plot, comprising:
        obtaining average daily outdoor temperatures over the time period;
        generating the plot of the historical daily fuel consumption averaged on a daily basis versus the average daily outdoor temperatures over the time period;
        determining the slope of the plot, convert the slope into average daily fuel usage rate, and equate the converted slope of the plot to the ratio of thermal conductivity over an efficiency of an HVAC system that provides the thermal conditioning to the building; and
        equating the x-intercept of the plot to a balance point temperature for the building; and
    evaluating the adjusted internal gains as a function of the ratio of thermal conductivity over HVAC system efficiency, difference between average indoor temperature and the balance point temperature, and the duration of the time period; and
    forecasting seasonal fuel consumption for the building associated with a change to the building using the historical daily fuel consumption and the adjusted internal gains, wherein the steps are performed by a suitably-programmed computer.

11. A method according to claim 10, further comprising dividing the slope by 24 to obtain the average daily fuel usage rate.

12. A method according to claim 10, further comprising:
    obtaining weekends and holidays in a season; and
    defining the time period comprising excluding the weekends and the holidays from the season.

13. A method according to claim 12, wherein the building is used for business purposes.

14. A method according to claim 10, wherein the change to the building comprises a change to one or more appliances within the building.

15. A method according to claim 10, wherein the change to the building affects the HVAC system efficiency.

16. A method according to claim 10, wherein the change to the building comprises at least one of an installation of or a change to an operation of a smart thermostat.

17. A method according to claim 10, further comprising: determining base seasonal fuel consumption $Q^{Fuel^*}$ for the building in accordance with:

$$Q^{Fuel^*} = [(Q^{Fuel} + Q^{Adj.Internal})R^{UA}R^{Temp} - Q^{Adj.Internal}R^{Internal}]\left(\frac{1}{R^\eta}\right)$$

where $Q^{Fuel}$ is the historical fuel consumption, $Q^{Adj.Internal}$ is the adjusted internal gains, $R^{UA}$ is the change in the thermal conductivity ratio, $R^{Temp}$ is the change in indoor temperature ratio, $R^{Internal}$ is the change in the internal gains ratio, $R^\eta$ is the change in the HVAC system efficiency ratio, and $R^{UA}=R^{Temp}=R^{Internal}=R^\eta=1$.

18. A method according to claim 10, wherein the change is performed based on the forecast.

19. A system for plot-based forecasting of change-related building seasonal fuel consumption forecasting for indoor thermal conditioning with the aid of a digital computer, comprising:
   a processor configured to execute code, the processor configured to:
      obtain historical daily fuel consumption for thermal conditioning of a building during a time period;
      identify internal gains within the building over the time period;
      determine adjusted internal gains for the building using a plot, comprising:
         obtain average daily outdoor temperatures over the time period;
         generate the plot of the historical daily fuel consumption averaged on a daily basis versus the average daily outdoor temperatures over the time period;
         determine the slope of the plot, convert the slope into average daily fuel usage rate, and equate the converted slope of the plot to the ratio of thermal conductivity over an efficiency of an HVAC system that provides the thermal conditioning to the building; and
         equate the x-intercept of the plot to a balance point temperature for the building; and
         evaluate the adjusted internal gains as a function of the ratio of thermal conductivity over HVAC system efficiency, difference between average indoor temperature and the balance point temperature, and the duration of the time period; and
      forecast seasonal fuel consumption for the building associated with a change to the building using the historical daily fuel consumption and the adjusted internal gains, wherein the change is performed based on the forecast.

\* \* \* \* \*